United States Patent
Park et al.

(10) Patent No.: US 12,556,627 B2
(45) Date of Patent: Feb. 17, 2026

(54) ELECTRONIC DEVICE INCLUDING HOUSING HAVING DISSIMILAR METALS

(71) Applicant: SAMSUNG ELECTRONICS CO., LTD., Suwon-si (KR)

(72) Inventors: Sungduck Park, Suwon-si (KR); Kwondeuk Yoon, Suwon-si (KR); Kitae Park, Suwon-si (KR); Yunho Son, Suwon-si (KR); Jaehoon Yoon, Suwon-si (KR); Cheolwoong Yoon, Suwon-si (KR); Youngsoo Kim, Suwon-si (KR); Kidoc Son, Suwon-si (KR); Hyunsuk Choi, Suwon-si (KR); Yongduk Kwon, Suwon-si (KR); Jongbo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 442 days.

(21) Appl. No.: 18/204,695

(22) Filed: Jun. 1, 2023

(65) Prior Publication Data

US 2024/0022655 A1    Jan. 18, 2024

Related U.S. Application Data

(63) Continuation of application No. PCT/KR2023/004660, filed on Apr. 6, 2023.

(30) Foreign Application Priority Data

Jul. 12, 2022  (KR) .................. 10-2022-0085987
Aug. 25, 2022  (KR) .................. 10-2022-0107114

(51) Int. Cl.
*H04W 88/02* (2009.01)
*H04M 1/02* (2006.01)
(Continued)

(52) U.S. Cl.
CPC ........... *H04M 1/026* (2013.01); *H04M 1/236* (2013.01); *H04W 88/02* (2013.01); *H05K 7/04* (2013.01)

(58) Field of Classification Search
None
See application file for complete search history.

(56) References Cited

U.S. PATENT DOCUMENTS

| 10,040,120 B2 | 8/2018 | Wang et al. |
| 10,321,590 B2 | 6/2019 | Cater et al. |

(Continued)

FOREIGN PATENT DOCUMENTS

| CN | 103974577 A | 8/2014 |
| CN | 107087363 A | 8/2017 |

(Continued)

OTHER PUBLICATIONS

International Search Report (PCT/ISA/210) issued Jul. 12, 2023 by the International Searching Authority in International Patent Application No. PCT/KR2023/004660.

(Continued)

*Primary Examiner* — San Htun
(74) *Attorney, Agent, or Firm* — Sughrue Mion, PLLC

(57) ABSTRACT

An electronic device includes: a side bezel structure including a first body surrounding an inner space of the device, and a second body extending from the first body into the inner space and including a through hole; a plate including a support portion within the inner space; a protrusion portion extending from the support portion into the through hole, the protrusion portion being coupling to the second body and corresponding to the through hole; and a conductive adhesive member coupling the through hole and the protrusion portion, which is disposed between the through hole and the protrusion portion. An area of the protrusion portion con- (Continued)

tacting one surface of the second body toward the support portion is narrower than an area of the protrusion portion contacting another surface of the second body.

20 Claims, 22 Drawing Sheets

(51) Int. Cl.
*H04M 1/23* (2006.01)
*H05K 7/04* (2006.01)

(56) References Cited

U.S. PATENT DOCUMENTS

| | | | |
|---|---|---|---|
| 10,652,372 B2 | 5/2020 | Wang et al. | |
| 10,665,926 B2 | 5/2020 | Kim et al. | |
| 11,013,109 B2* | 5/2021 | Han | G06F 1/1637 |
| 11,070,655 B2 | 7/2021 | Hill et al. | |
| 11,089,142 B2 | 8/2021 | Ren et al. | |
| 11,457,528 B2 | 9/2022 | Koo et al. | |
| 2009/0059485 A1* | 3/2009 | Lynch | H01H 9/0207 |
| | | | 361/679.01 |
| 2012/0071207 A1* | 3/2012 | Yoo | H04M 1/0266 |
| | | | 455/566 |
| 2014/0262847 A1* | 9/2014 | Yang | F16M 13/00 |
| | | | 206/37 |
| 2015/0220115 A1 | 8/2015 | Gao et al. | |
| 2016/0165027 A1* | 6/2016 | Hahn | G06F 3/04164 |
| | | | 455/566 |
| 2016/0254832 A1* | 9/2016 | Yoo | H01Q 13/10 |
| | | | 455/575.5 |
| 2018/0310426 A1* | 10/2018 | Cho | H05K 5/03 |
| 2020/0136243 A1* | 4/2020 | Shin | H01Q 1/243 |
| 2020/0153950 A1 | 5/2020 | Hill et al. | |
| 2020/0260605 A1 | 8/2020 | Lee et al. | |
| 2020/0379512 A1* | 12/2020 | Cho | G09F 9/302 |
| 2020/0384585 A1 | 12/2020 | Ren et al. | |
| 2021/0037125 A1* | 2/2021 | Jung | G03B 30/00 |

FOREIGN PATENT DOCUMENTS

| | | |
|---|---|---|
| CN | 108476248 B | 2/2021 |
| CN | 110582388 B | 2/2023 |
| JP | 6220900 B2 | 10/2017 |
| KR | 10-2017-0037464 A | 4/2017 |
| KR | 10-2019-0037739 A | 4/2019 |
| KR | 10-2020-0139977 A | 12/2020 |

OTHER PUBLICATIONS

Written Opinion (PCT/ISA/237) issued Jul. 12, 2023 by the International Searching Authority in International Patent Application No. PCT/KR2023/004660.

* cited by examiner

ELECTRONIC DEVICE INCLUDING HOUSING HAVING DISSIMILAR METALS

CROSS-REFERENCE TO RELATED APPLICATIONS

This application is a continuation of PCT/KR2023/004660, filed on Apr. 6, 2023, at the Korean Intellectual Property Receiving Office and claims priority under 35 U.S.C. § 119 to Korean Patent Application No. 10-2022-0085987, filed on Jul. 12, 2022 at the Korean Intellectual Property Office and to Korean Patent Application No. 10-2022-0107114, filed on Aug. 25, 2022 at the Korean Intellectual Property Office, the disclosures of each which are incorporated by reference herein in their entireties.

TECHNICAL FIELD

The disclosure relates to an electronic device including a housing having dissimilar metals.

BACKGROUND

An electronic device may include a housing that forms the appearance of the electronic device. The housing may be composed of a plurality of detachable structures. The plurality of structures may be coupled to each other to form a housing. At least a part of the plurality of structures may include a metal material to provide rigidity of the housing. For example, the metal may include titanium, stainless steel, aluminum, and/or magnesium. The plurality of structures may include different metal materials. The electronic device may be configured to communicate with an external electronic device through a conductive portion of the housing.

SUMMARY

According to an aspect of the disclosure, an electronic device may include: a side bezel structure including a first body surrounding at least a portion of an inner space of the electronic device, and a second body extending from the first body into the inner space and including a through hole; a plate including a support portion within the inner space; a protrusion portion extending from the support portion into the through hole, the protrusion portion being coupling to the second body and corresponding to the shape of the through hole; and a conductive adhesive member coupling the through hole and the protrusion portion, the conductive adhesive member being disposed between the through hole and the protrusion portion. A cross-sectional area of the protrusion portion contacting one surface of the second body toward the support portion may be narrower than a cross-sectional area of the protrusion portion contacting another surface of the second body, and the another surface of the second body may be opposite to the one surface of the second body.

According to another aspect of the disclosure, an electronic device may include: a side bezel structure including a first body surrounding at least a portion of an inner space of the electronic device, a second body extending from the first body into the inner space and including a through hole, a conductive portion including a first metal having a first hardness, and a non-conductive portion in contact with the conductive portion. The electronic device also may include a plate including a support portion within the inner space and a protrusion portion extending from the support portion into the through hole and coupling to the second body and corresponding to a shape of the through hole, and a second metal having a second hardness lower than the first hardness. The electronic device also may include a conductive adhesive member electrically connecting the through hole and the protrusion portion and disposed between the through hole and the protrusion portion. The electronic device also may include a wireless communication circuit operatively coupling with the conductive portion. A cross-sectional area of the protrusion portion may be narrower than a cross-sectional area of the protrusion portion contacting another surface of the second body. The cross-sectional area of the protrusion portion contacts one surface of the second body toward the support portion. The another surface of the second body may be opposite to the one surface of the second body.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
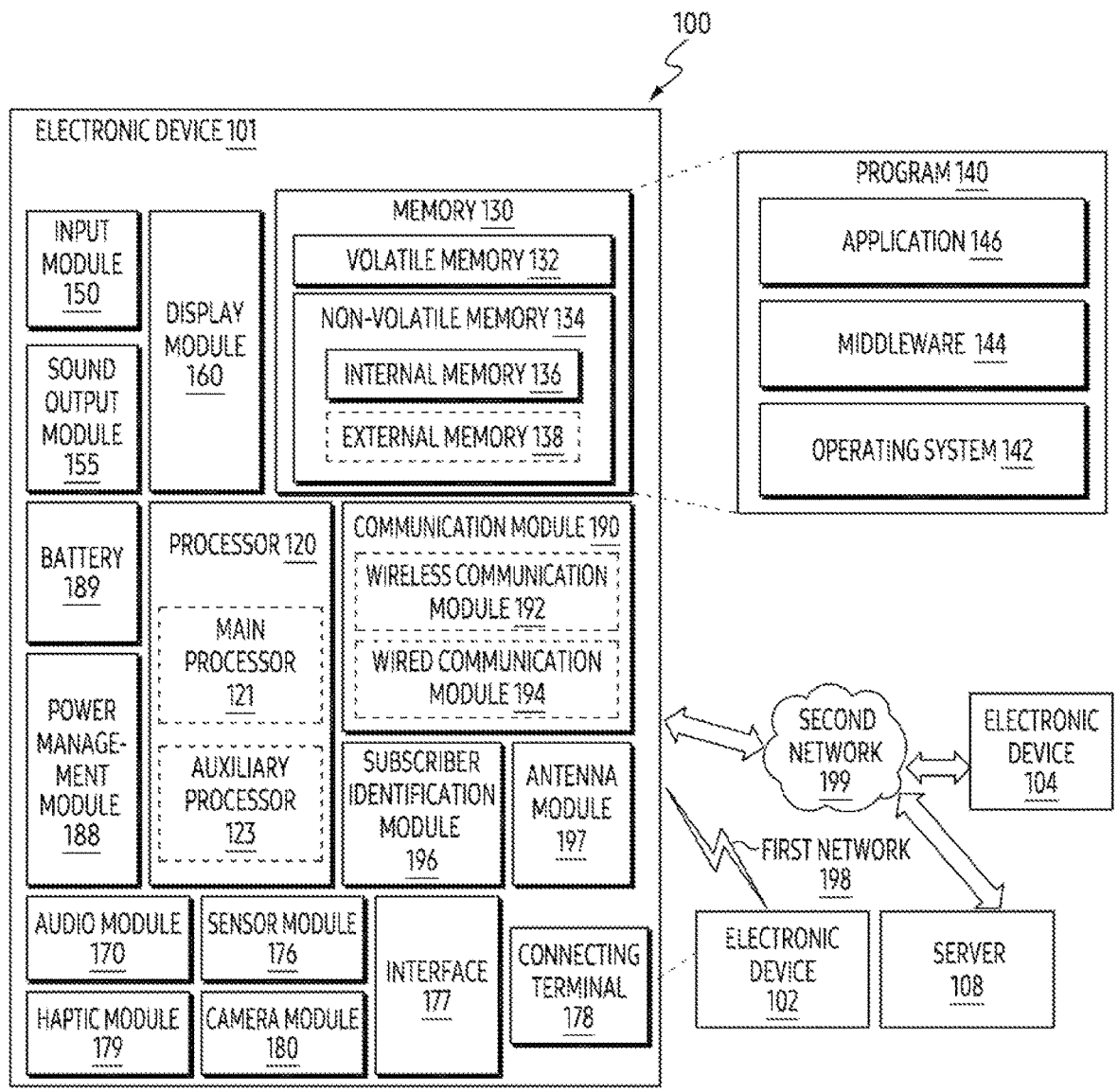
FIG. 1 is a block diagram of an electronic device in a network environment according to an embodiment.

FIG. 1 is a block diagram illustrating an electronic device 101 in a network environment 100 according to one or more embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to one or more embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
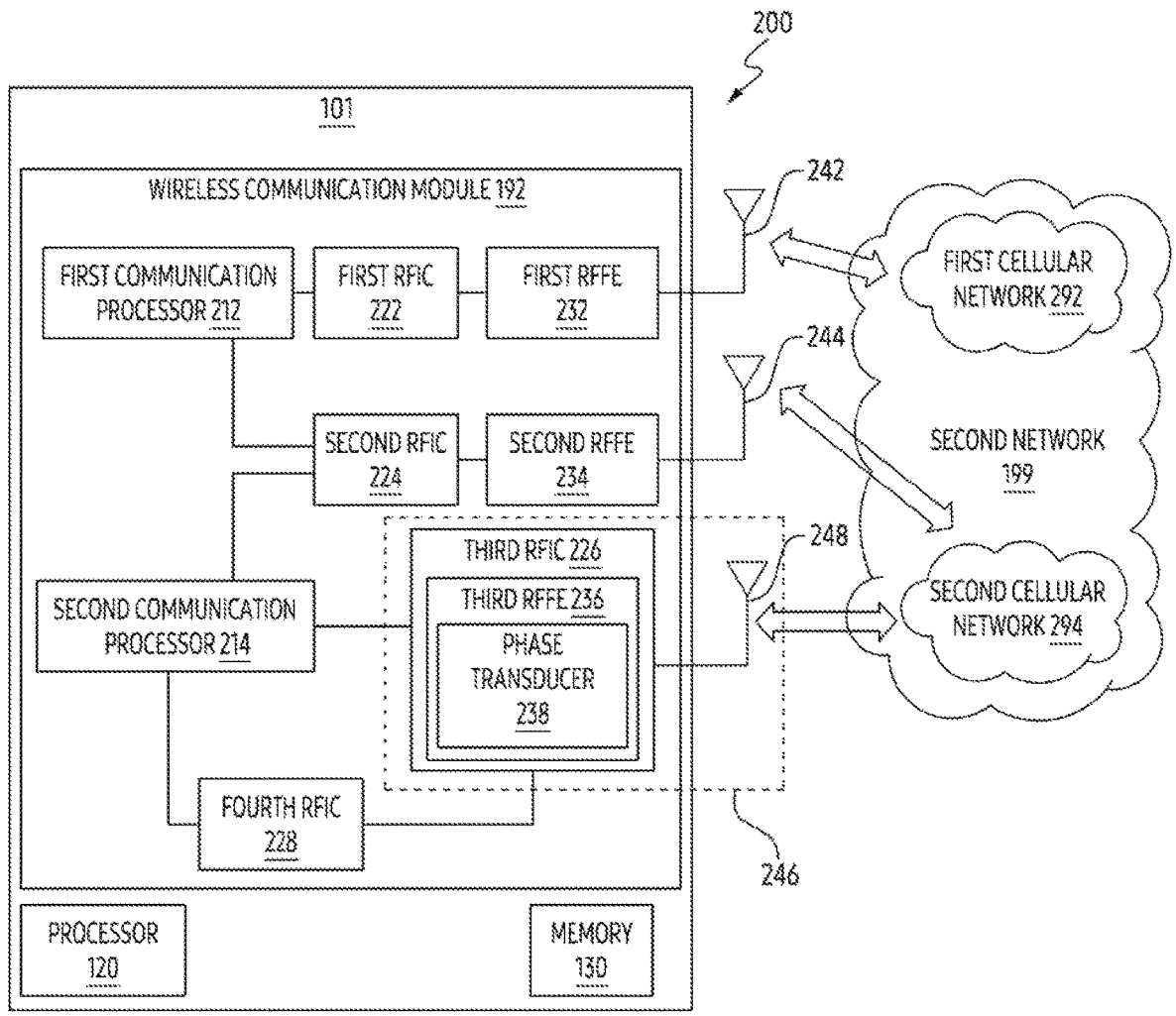
FIG. 2 is a block diagram of an electronic device for supporting legacy network communication and 5G network communication, according to an embodiment.

FIG. 2 is a block diagram 200 of the electronic device 101 for supporting legacy network communication and 5G network communication, according to one or more embodiments.

Referring to FIG. 2, the electronic device 101 may include a first communication processor 212, a second communication processor 214, a first radio frequency integrated circuit (RFIC) 222, a second RFIC 224, and a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first cellular network 292 and a second cellular network 294. According to another embodiment, the electronic device 101 may further include at least one of the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may constitute at least a part of a wireless communication module 192. According to another embodiment, the fourth RFIC 228 may be omitted or may be included as a part of the third RFIC 226.

The first communication processor 212 may support the establishment of a communication channel of a band to be used for wireless communication with the first cellular network 292 and legacy network communication through the established communication channel. According to one or more embodiments, the first cellular network 292 may be a legacy network including a 2nd generation (2G), 3rd generation (3G), 4th generation (4G), and/or long-term evolution (LTE) network. The second communication processor 214 may support the establishment of a communication channel corresponding to a specified band (e.g., approximately 6 GHz to 60 GHz) among bands to be used for wireless communication with the second cellular network 294, and 5G network communication through the established communication channel. According to one or more embodiments, the second cellular network 294 may be a 5G network defined by 3rd Generation Partnership Project (3GPP). Additionally, according to an embodiment, the first communication processor 212 or the second communication processor 214 may support the establishment of a communication channel corresponding to another specified band (e.g., approximately 6 GHz or less) among bands to be used for wireless communication with the second cellular network 294, and 5G network communication through the established communication channel. According to an embodiment, the first communication processor 212 and the second communication processor 214 may be implemented in a single chip or a single package. According to one or more embodiments, the first communication processor 212 or the second communication processor 214 may be formed with the processor 120, the auxiliary processor 123 of FIG. 1, or the communication module 190 in a single chip or a single package.

Upon transmission, the first RFIC 222 may convert a baseband signal generated by the first communication processor 212 into a radio frequency (RF) signal of approximately 700 MHz to approximately 3 GHz used in the first cellular network 292 (e.g., a legacy network). Upon reception, an RF signal may be obtained from the first cellular network 292 (e.g., a legacy network) through an antenna (e.g., the first antenna module 242), and may be preprocessed through an RFFE (e.g., the first RFFE 232). The first RFIC 222 may convert the preprocessed RF signal into a baseband signal so as to be processed by the first communication processor 212.

Upon transmission, the second RFIC 224 may convert a baseband signal generated by the first communication processor 212 or the second communication processor 214 into an RF signal (hereinafter, referred to as a 5G Sub6 RF signal) of the Sub6 band (e.g., approximately 6 GHz or less) used in the second cellular network 294 (e.g., the 5G network). Upon reception, a 5G Sub6 RF signal may be obtained from the second cellular network 294 (e.g., the 5G network) through an antenna (e.g., the second antenna module 244), and may be preprocessed through an RFFE (e.g., the second RFFE 234). The second RFIC 224 may convert the preprocessed 5G Sub6 RF signal into a baseband signal so as to be processed by a corresponding one of the first communication processor 212 or the second communication processor 214.

The third RFIC 226 may convert a baseband signal generated by the second communication processor 214 into an RF signal (hereinafter, referred to as a 5G Above6 RF signal) of the 5G Above6 band (e.g., approximately 6 GHz to approximately 60 GHz) to be used in the second cellular network 294 (e.g., the 5G network). Upon reception, a 5G Above6 RF signal may be obtained from the second cellular network 294 (e.g., the 5G network) through an antenna (e.g., the antenna 248), and may be preprocessed through the third RFFE 236. For example, the third RFFE 236 may perform preprocessing of the signal by using a phase shifter 238. The third RFIC 226 may convert the preprocessed 5G Above6 RF signal into a baseband signal so as to be processed by the second communication processor 214. According to an embodiment, the third RFFE 236 may be formed as a part of the third RFIC 226.

According to an embodiment, the electronic device 101 may include the fourth RFIC 228 separately from or at least as a part of the third RFIC 226. In this case, the fourth RFIC 228 may convert the baseband signal generated by the second communication processor 214 into an RF signal (hereinafter, referred to as an intermediate frequency (IF) signal) of an intermediate frequency band (e.g., approximately 9 GHz to approximately 11 GHz), and then transmit the IF signal to the third RFIC 226. The third RFIC 226 may convert the IF signal into a 5G Above6 RF signal. Upon reception, a 5G Above6 RF signal may be received from the second cellular network 294 (e.g., the 5G network) through an antenna (e.g., the antenna 248), and may be converted into an IF signal by the third RFIC 226. The fourth RFIC 228 may convert the IF signal into the baseband signal so as to be processed by the second communication processor 214.

According to an embodiment, the first RFIC 222 and the second RFIC 224 may be implemented as a single chip or at least a part of a single package. According to an embodiment, the first RFFE 232 and the second RFFE 234 may be implemented as a single chip or at least a part of a single package. According to an embodiment, at least one of the first antenna module 242 or the second antenna module 244 may be omitted or combined with another antenna module to process RF signals of a plurality of corresponding bands.

According to an embodiment, the third RFIC 226 and the antenna 248 may be disposed on the same substrate to form a third antenna module 246. For example, the wireless communication module 192 or the processor 120 may be disposed on a first substrate (e.g., a main PCB). In this case, the third RFIC 226 may be disposed in a partial region (e.g., the lower surface) of a second substrate (e.g., a sub PCB) separate from the first substrate, and the antenna 248 may be disposed in another partial region (e.g., the upper surface) to form the third antenna module 246. According to an embodiment, the antenna 248 may include, for example, an antenna array that may be used for beamforming. By disposing the third RFIC 226 and the antenna 248 on the same substrate, it is possible to reduce the length of the transmission line therebetween. This, for example, may reduce the loss (e.g., attenuation) of a signal in a high frequency band (e.g., approximately 6 GHz to approximately 60 GHz) used for 5G network communication by the transmission line. Accordingly, the electronic device 101 may improve the quality or speed of communication with the second cellular network 294 (e.g., the 5G network).

The second cellular network 294 (e.g., the 5G network) may be operated independently of (e.g., Stand-Alone (SA)) or operated to be connected to (e.g., Non-Stand Alone (NSA)) the first cellular network 292 (e.g., the legacy network). For example, in the 5G network, there may be only an access network (e.g., 5G radio access network (RAN) or next-generation RAN (NG RAN)) and no core network (e.g., next-generation core (NGC)). In this case, after accessing the access network of the 5G network, the electronic device 101 may access an external network (e.g., the Internet) under the control of a core network (e.g., evolved packed core (EPC)) of the legacy network. Protocol information for communication with the legacy network (e.g., LTE protocol information) or protocol information for communication with the 5G network (e.g., New Radio (NR) protocol information) may be stored in the memory 230 and may be accessed by other components (e.g., the processor 120, the first communication processor 212, or the second communication processor 214).

Figure 3:
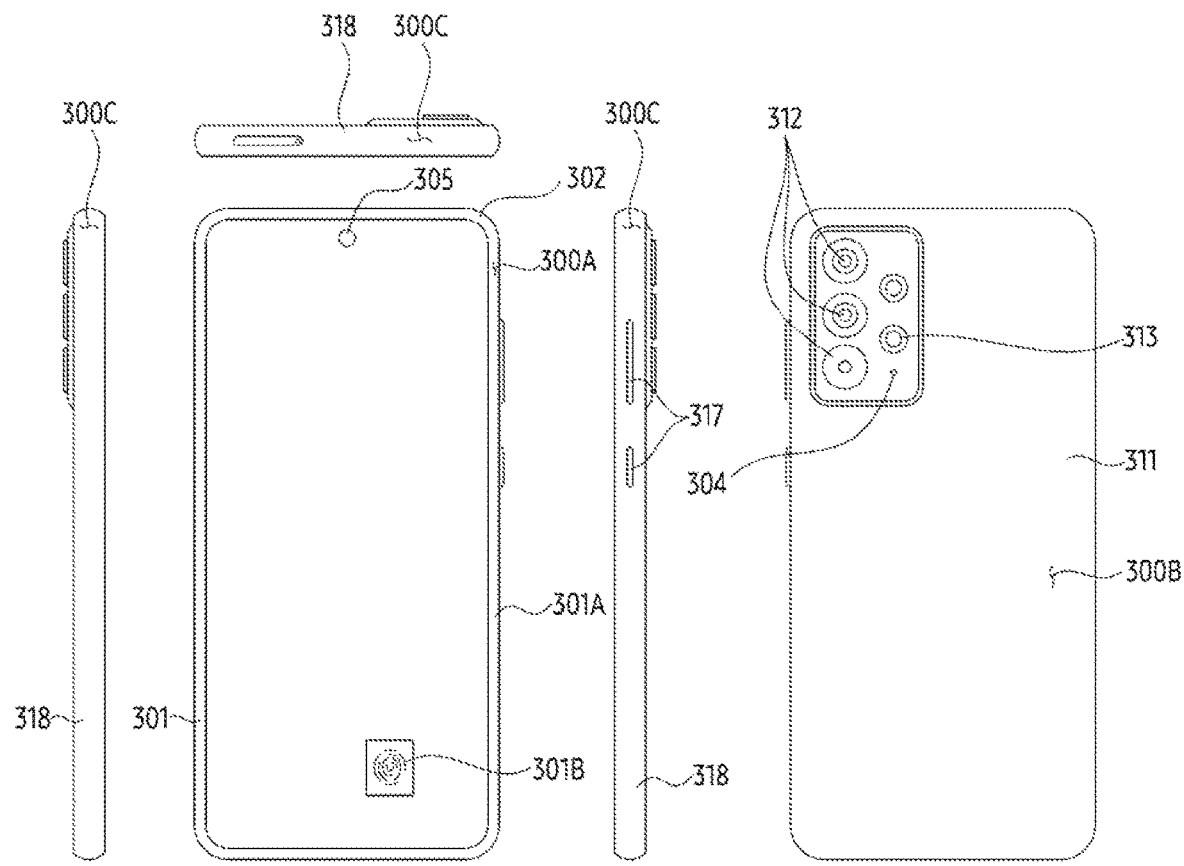
FIG. 3 is a diagram illustrating an electronic device according to an embodiment.

FIG. 3 is a diagram illustrating an electronic device according to an embodiment.

Referring to FIG. 3, an electronic device 101 (e.g., an electronic device 101 of FIG. 1) according to an embodiment may include a housing 310 forming an exterior of the electronic device 101 device 101. For example, the housing 310 may include a first surface 300A (e.g., a front surface), a second surface 300B (e.g., a rear surface), and a third surface 300C (e.g., a side surface) surrounding a space between the first surface 300A and the second surface 300B. In an embodiment, the housing 310 may refer to a structure (e.g., a support structure 340 of FIG. 4) forming at least a portion of the first surface 300A, the second surface 300B, and/or the third surface 300C.

The electronic device 101 device 101 according to an embodiment may include a substantially transparent front plate 302. In an embodiment, the front plate 302 may form at least a portion of the first surface 300A. In an embodiment, the front plate 302 may include, for example, a glass plate including various coating layers or a polymer plate, but is not limited thereto.

The electronic device 101 device 101 according to an embodiment may include a substantially opaque rear plate 311. In an embodiment, the rear plate 311 may form at least a portion of the second surface 300B. In an embodiment, the rear plate 311 may be formed of coated or colored glass, ceramic, polymer, metal (e.g., aluminum, stainless steel (STS), or magnesium), or a combination of at least two of the above materials.

Figure 4:
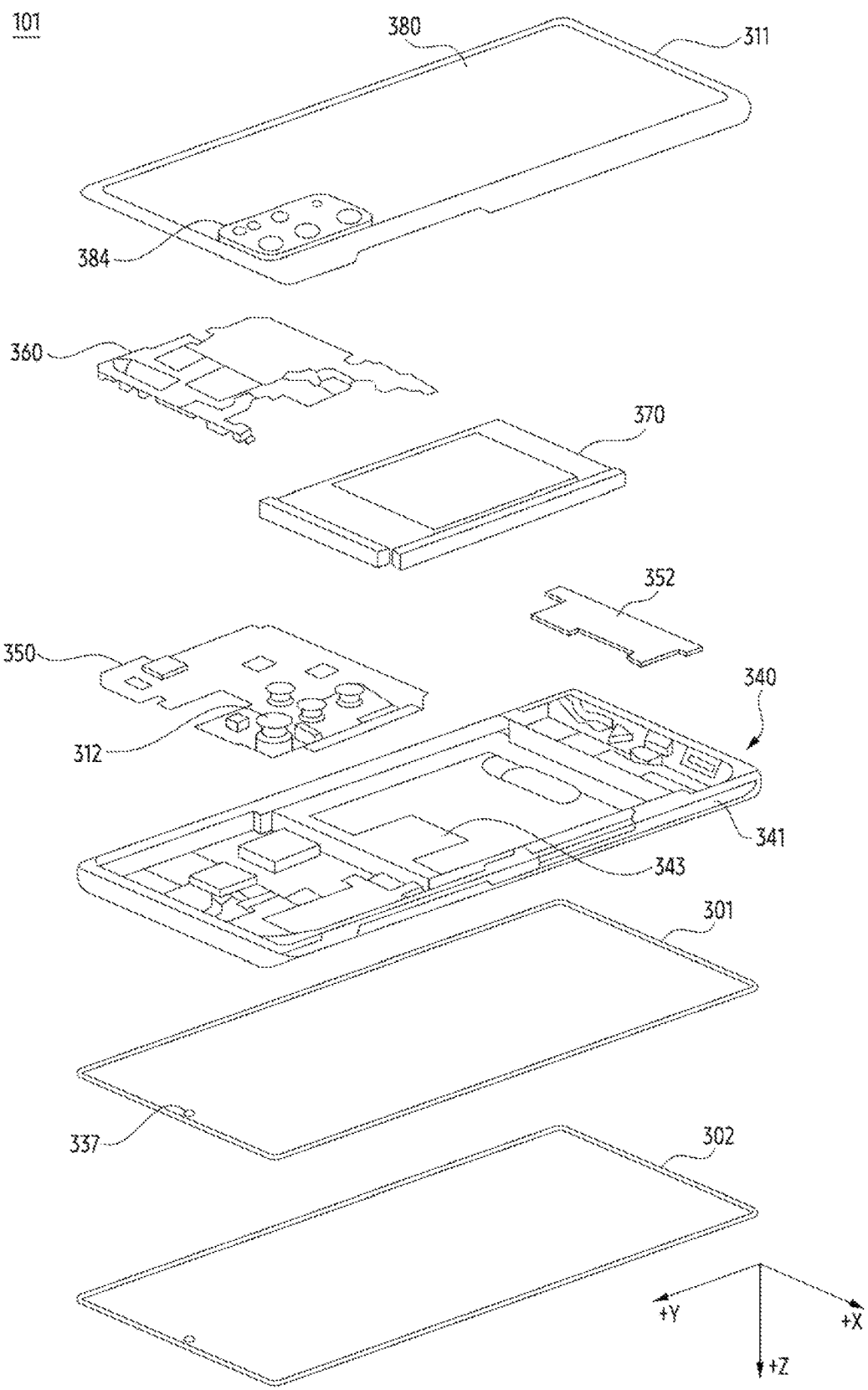
FIG. 4 is an exploded perspective view of an electronic device according to an embodiment.

The electronic device 101 device 101 according to an embodiment may include a side bezel structure (or side member) 318 (e.g., a sidewall 341 of a support structure 340 of FIG. 4). In an embodiment, the side bezel structure 318 may be coupled to the front plate 302 and/or the rear plate 311 to form at least a portion of the third surface 300C of the electronic device 101. For example, the side bezel structure 318 may form all of the third surface 300C of the electronic device 101, and for another example, the side bezel structure 318 may form the third surface 300C of the electronic device 101 together with the front plate 302 and/or the rear plate 311.

Unlike the illustrated embodiment, when the third surface 300C of the electronic device 101 is partially formed by the front plate 302 and/or the rear plate 311, the front plate 302 and/or the rear plate 311 may include a region that is bent from a periphery thereof toward the rear plate 311 and/or the front plate 302 and seamlessly extends. The extended region of the front plate 302 and/or the rear plate 311 may be positioned at both ends of, for example, a long edge of the electronic device 101, but is not limited to the above-described examples.

In an embodiment, the side bezel structure 318 may include a metal and/or a polymer. In an embodiment, the rear plate 311 and the side bezel structure 318 may be integrally formed and may include the same material (e.g., a metal material such as aluminum), but are not limited thereto. For example, the rear plate 311 and the side bezel structure 318 may be formed in separate configurations and/or may include different materials.

In an embodiment, the electronic device 101 may include at least one of a display 301, an audio module 303, 304, 307, a sensor module, a camera module 305, 312, 313, a key input device 317, a light emitting device, and/or a connector hole 308. In another embodiment, the electronic device 101 may omit at least one of the components (e.g., a key input device 317 or a light emitting device), or may further include another component.

In an embodiment, the display 301 display 301 (e.g., a display module 160 of FIG. 1) may be visually exposed through a substantial portion of the front plate 302. For example, at least a portion of the display 301 display 301 may be visible through the front plate 302 forming the first surface 300A. In an embodiment, the display 301 may be disposed on the rear surface of the front plate 302.

In an embodiment, the appearance of the display 301 may be formed substantially the same as the appearance of the front plate 302 adjacent to the display 301. In an embodiment, in order to expand the area in which the display 301 is visually exposed, the distance between the outside of the display 301 and the outside of the front plate 302 may be formed to be generally the same.

In an embodiment, the display 301 (or the first surface 300A of the electronic device 101) may include a screen display area 301A. In an embodiment, the display 301 may provide visual information to a user through the screen display area 301A. In the illustrated embodiment, when the first surface 300A is viewed from the front, it is illustrated that the screen display area 301A is spaced apart from the outside of the first surface 300A and is positioned inside the first surface 300A, but it is not limited thereto. In another embodiment, when the first surface 300A is viewed from the front, at least a portion of the periphery of the screen display area 301A may substantially coincide with the periphery of the first surface 300A (or the front plate 302).

In an embodiment, the screen display area 301A may include a sensing area 301B configured to obtain biometric information of a user. In one embodiment, the screen display area 301A includes the sensing area 301B. In other words, at least a portion of the sensing area 301B may be overlapped on the screen display area 301A. For example, the sensing area 301B, like other areas of the screen display area 301A, may refer to an area in which visual information may be displayed by the display 301 and additionally biometric information (e.g., fingerprint) of a user may be obtained. In another embodiment, the sensing area 301B may be formed in the key input device 317.

In an embodiment, the display 301 may include an area in which the first camera module 305 (e.g., a camera module 180 of FIG. 1) is positioned. In an embodiment, an opening may be formed in the area of the display 301, and the first camera module 305 (e.g., a punch hole camera) may be at least partially disposed in the opening to face the first surface 300A. In this case, the screen display area 301A may surround at least a portion of the periphery of the opening. In another embodiment, the first camera module 305 (e.g., an under display camera (UDC)) may be disposed under the display 301 to overlap the area of the display 301. In this case, the display 301 may provide visual information to the user through the area, and additionally, the first camera module 305 may obtain an image corresponding to a direction facing the first surface 300A through the area of the display 301.

In an embodiment, the display 301 may be coupled to or disposed adjacent to a touch sensing circuit, a pressure sensor capable of measuring the intensity (pressure) of the touch, and/or a digitizer that detects a magnetic field type stylus pen.

In an embodiment, the audio modules 303, 304 and 307 (e.g., an audio module 170 of FIG. 1) may include microphone holes 303 and 304 and a speaker hole 307.

In an embodiment, the microphone holes 303 and 304 may include a first microphone hole 303 formed in a partial area of the third surface 300C and a second microphone hole 304 formed in a partial area of the second surface 300B. A microphone for obtaining an external sound may be disposed inside the microphone holes 303 and 304. The microphone may include a plurality of microphones to detect the direction of sound.

In an embodiment, the second microphone hole 304 formed in a partial area of the second surface 300B may be disposed adjacent to the camera modules 305, 312 and 313. For example, the second microphone hole 304 may obtain sound according to operations of the camera modules 305, 312, and 313. However, it is not limited thereto.

In an embodiment, the speaker hole 307 may include an external speaker hole 307 and a receiver hole for a call. The external speaker hole 307 may be formed on a portion of the third surface 300C of the electronic device 101. In another embodiment, the external speaker hole 307 may be implemented as one hole with the microphone hole 303. A receiver hole for a call may be formed on another portion of the third surface 300C. For example, the receiver hole for a call may be formed on the opposite side of the external speaker hole 307 on the third surface 300C. For example, based on the illustration of FIG. 3, the external speaker hole 307 may be formed on the third surface 300C corresponding to the lower end of the electronic device 101, and the receiver hole for a call may be formed on the third surface 300C corresponding to the upper end of the electronic device 101. However, the disclosure is not limited thereto, and in another embodiment, the receiver hole for a call may be formed at a position other than the third surface 300C. For example, the receiver hole for a call may be formed by a space spaced apart between the front plate 302 (or display 301) and the side bezel structure 318.

In an embodiment, the electronic device 101 may include at least one speaker configured to output sound to the outside of the housing 310 through an external speaker hole 307 and/or a receiver hole for a call.

In an embodiment, the sensor module (e.g., a sensor module 176 of FIG. 1) may generate an electrical signal or data value corresponding to an internal operating state or an external environmental state of the electronic device 101. For example, the sensor module may include at least one of a proximity sensor, an HRM sensor, a fingerprint sensor, a gesture sensor, a gyro sensor, a pressure sensor, a magnetic sensor, an acceleration sensor, a grip sensor, a color sensor, an infrared (IR) sensor, a biometric sensor, a temperature sensor, a humidity sensor, and an illumination sensor.

In an embodiment, the camera modules 305, 312 and 313 (e.g., a camera module 180 of FIG. 1) may include a first camera module 305 disposed to face the first surface 300A of the electronic device 101, a second camera module 312 disposed to face the second surface 300B, and a flash 313.

In an embodiment, the second camera module 312 may include a plurality of cameras (e.g., a dual camera, a triple camera, or a quad camera). However, the second camera module 312 is not necessarily limited to including a plurality of cameras, and may include one camera.

In an embodiment, the first camera module 305 and the second camera module 312 may include one or a plurality of lenses, an image sensor, and/or an image signal processor.

In an embodiment, the flash 313 may include, for example, a light emitting diode or a xenon lamp. In another embodiment, two or more lenses (infrared camera, wide-angle and telephoto lens) and image sensors may be disposed on one side of electronic device 101.

In an embodiment, the key input device 317 (e.g., an input module 150 of FIG. 1) may be disposed on the third surface 300C of the electronic device 101. In another embodiment, the electronic device 101 may not include some or all of the key input devices 317, and the not included key input device 317 may be implemented on the display 301 in another form such as a soft key.

In an embodiment, the connector hole 308 may be formed on the third surface 300C of the electronic device 101 to accommodate the connector of the external device. A connection terminal (e.g., a connection terminal 178 of FIG. 1) electrically connected to the connector of the external device may be disposed in the connector hole 308. The electronic device 101 according to an embodiment may include an interface module (e.g., an interface 177 of FIG. 1) for processing electrical signals transmitted and received through the connection terminal.

In an embodiment, the electronic device 101 may include a light emitting device. For example, the light emitting device may be disposed on the first surface 300A of the housing 310. The light emitting device may provide state information of the electronic device 101 in a form of light. In another embodiment, the light emitting device may provide a light source when the first camera module 305 is operated. For example, the light emitting device may include an LED, an IR LED, and/or a xenon lamp.

FIG. 4 is an exploded perspective view of an electronic device according to an embodiment. Hereinafter, overlapping descriptions of components having the same reference numerals as those of the above-described components will be omitted.

Referring to FIG. 4, the electronic device 101 according to an embodiment may include a support structure 340, a first printed circuit board 350, a second printed circuit board 352, a cover plate 360, and a battery 370.

In an embodiment, the support structure 340 may include a sidewall 341 forming an exterior (e.g., the third surface 300C of FIG. 3) of the electronic device 101 and a support portion 343 extending inward from the sidewall 341. In an embodiment, the support structure 340 may be disposed between the display 301 and the rear plate 311. In an embodiment, the sidewall 341 of the support structure 340 may surround a space between the rear plate 311 and the front plate 302 (and/or the display 301), and the support portion 343 of the support structure 340 may extend from the sidewall 341 within the space.

In an embodiment, the support structure 340 may support or accommodate other components included in the electronic device 101. For example, the display 301 may be disposed on one surface of the support structure 340 facing one direction (e.g., the +z direction), and the display 301 may be supported by the support portion 343 of the support structure 340. For another example, a first printed circuit board 350, a second printed circuit board 352, a battery 370, and a second camera module 312 may be disposed on the other surface facing a direction opposite to the one direction (e.g., the −z direction) of the support structure 340. The first printed circuit board 350, the second printed circuit board 352, the battery 370, and the second camera module 312 may be mounted on a recess defined by the sidewall 341 and/or the support portion 343 of the support structure 340.

In an embodiment, the first printed circuit board 350, the second printed circuit board 352, and the battery 370 may be coupled to the support structure 340, respectively. For example, the first printed circuit board 350 and the second printed circuit board 352 may be fixedly disposed in the support structure 340 through a coupling member such as a screw. For example, the battery 370 may be fixedly disposed on the support structure 340 through an adhesive member (e.g., a double-sided tape). However, it is not limited by the above-described example.

In an embodiment, a cover plate 360 may be disposed between the first printed circuit board 350 and the rear plate 311. In an embodiment, the cover plate 360 may be disposed on the first printed circuit board 350. For example, the cover plate 360 may be disposed on a surface facing the −z direction of the first printed circuit board 350.

In an embodiment, the cover plate 360 may at least partially overlap the first printed circuit board 350 with respect to the z-axis. In an embodiment, the cover plate 360 may cover at least a partial area of the first printed circuit board 350. Through this, the cover plate 360 may protect the first printed circuit board 350 from physical impact or prevent the connector coupled to the first printed circuit board 350 from being separated.

In an embodiment, the cover plate 360 may be fixedly disposed on the first printed circuit board 350 through a coupling member (e.g., a screw), or may be coupled to the support structure 340 together with the first printed circuit board 350 through the coupling member.

In an embodiment, the display 301 may be disposed between the support structure 340 and the front plate 302. For example, a front plate 302 may be disposed on one side (e.g., a +z direction) of the display 301 and a support structure 340 may be disposed on the other side (e.g., a −z direction).

In an embodiment, the front plate 302 may be coupled to the display 301. For example, the front plate 302 and the display 301 may adhere to each other through an optical adhesive member (e.g., optically clear adhesive (OCA) or optically clear resin (OCR)) interposed therebetween.

In an embodiment, the front plate 302 may be coupled to the support structure 340. For example, the front plate 302 may include an outside portion extending outside the display 301 when viewed in the z-axis direction, and may adhere to the support structure 340 through an adhesive member (e.g., a double-sided tape) disposed between the outside portion of the front plate 302 and the support structure 340 (e.g., the sidewall 341). However, it is not limited by the above-described example.

In an embodiment, the first printed circuit board 350 and/or the second printed circuit board 352 may be equipped with a processor (e.g., a processor 120 of FIG. 1), a memory (e.g., a memory 130 of FIG. 1), and/or an interface (e.g., an interface 177 of FIG. 1). The processor may include, for example, one or more of a central processing unit, an application processor, a graphic processing unit, an image signal processor, a sensor hub processor, or a communication processor. The memory may include, for example, a volatile memory or a nonvolatile memory. The interface may include, for example, a high definition multimedia interface (HDMI), a universal serial bus (USB) interface, an SD card interface, and/or an audio interface. The interface may electrically or physically connect the electronic device 101 to an external electronic device, and may include a USB connector, an SD card/MMC connector, or an audio connector. In an embodiment, the first printed circuit board 350 and the second printed circuit board 352 may be operatively or electrically connected to each other through a connection member (e.g., a flexible printed circuit board).

In an embodiment, the battery 370 may supply power to at least one component of the electronic device 101. For example, the battery 370 may include a rechargeable secondary cell or a fuel cell. At least a portion of the battery 370 may be disposed on substantially the same plane as the first printed circuit board 350 and/or the second printed circuit board 352.

The electronic device 101 according to an embodiment may include an antenna module (e.g., an antenna module 197 of FIG. 1). In an embodiment, the antenna module may be disposed between the rear plate 311 and the battery 370. The antenna module may include, for example, a near field communication (NFC) antenna, a wireless charging antenna, and/or a magnetic secure transmission (MST) antenna. The antenna module, for example, may perform short-range communication with an external device, or wirelessly transmit and receive power to and from the external device.

In an embodiment, the first camera module 305 (e.g., a front camera) may be disposed in at least a portion (e.g., a support portion 343) of the support structure 340 so that the lens may receive external light through a partial area (e.g., a camera area 137 of FIG. 3) of the front plate 302.

In an embodiment, the second camera module 312 (e.g., a rear camera) may be disposed between the support structure 340 and the rear plate 311. In an embodiment, the second camera module 312 may be electrically connected to the first printed circuit board 350 through a connection member (e.g., a connector). In an embodiment, the second camera module 312 may be disposed such that the lens may receive external light through a camera area 384 of the rear plate 311 of the electronic device 101.

In an embodiment, the camera area 384 may be formed on the surface (e.g., a rear surface 300B of FIG. 3) of the rear plate 311. In an embodiment, the camera area 384 may be formed to be at least partially transparent so that external light may be incident to the lens of the second camera module 312. In an embodiment, at least a portion of the camera area 384 may protrude from the surface of the rear plate 311 to a predetermined height. However, it is not limited to thereto, and in another embodiment, the camera area 384 may form a plane substantially the same as the surface of the rear plate 311.

In an embodiment, the housing (e.g., a housing 310 of FIG. 3) of the electronic device 101 may mean a configuration or structure forming at least a portion of the exterior of the electronic device 101. In this regard, at least a portion of the front plate 302, the support structure 340, and/or the rear plate 311 forming the exterior of the electronic device 101 may be referred to as the housing of the electronic device 101.

Figure 5A:
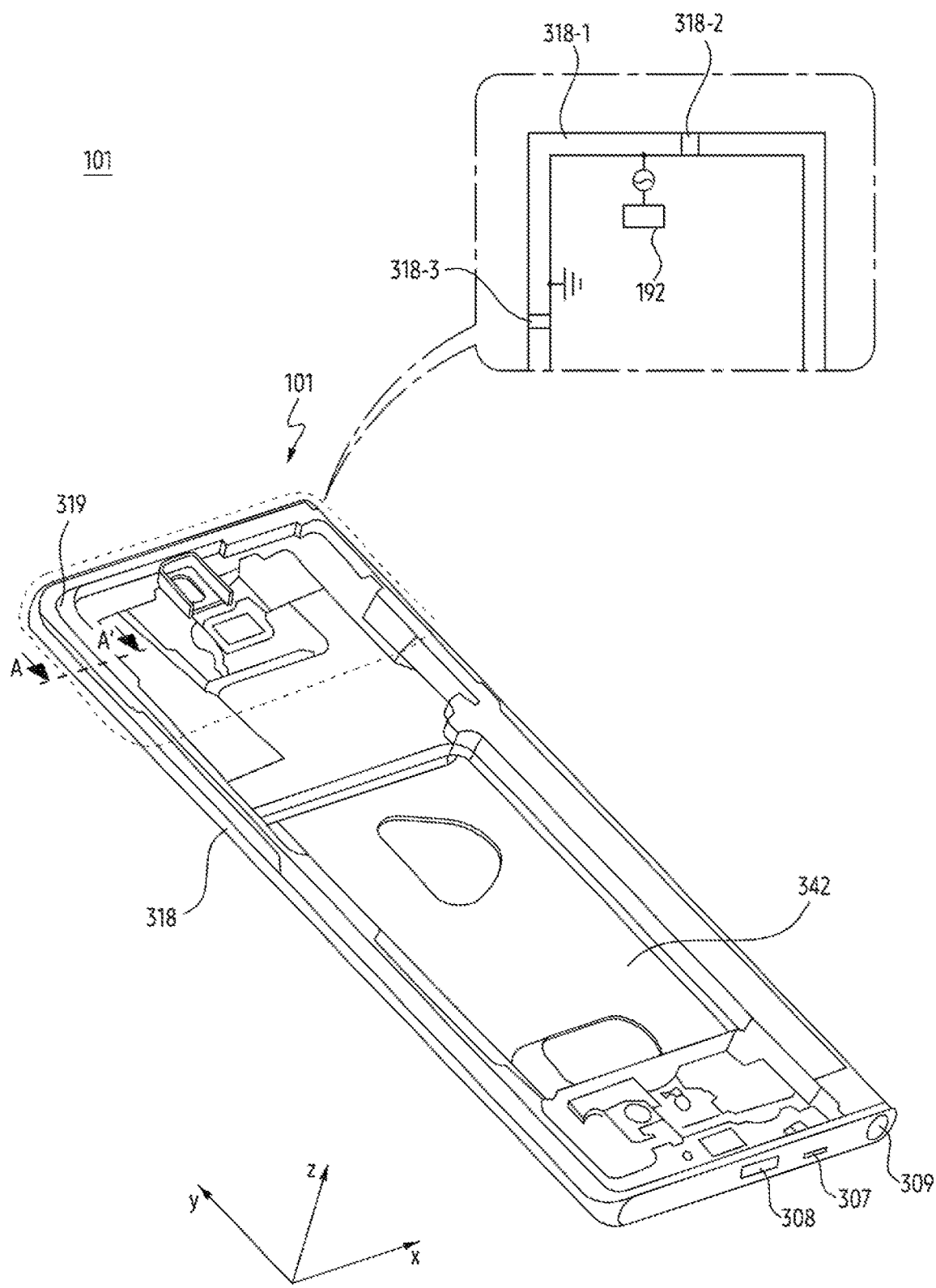
FIG. 5A illustrates a state in which a side bezel structure of an exemplary electronic device and a plate are coupled to each other.
Figure 5B:
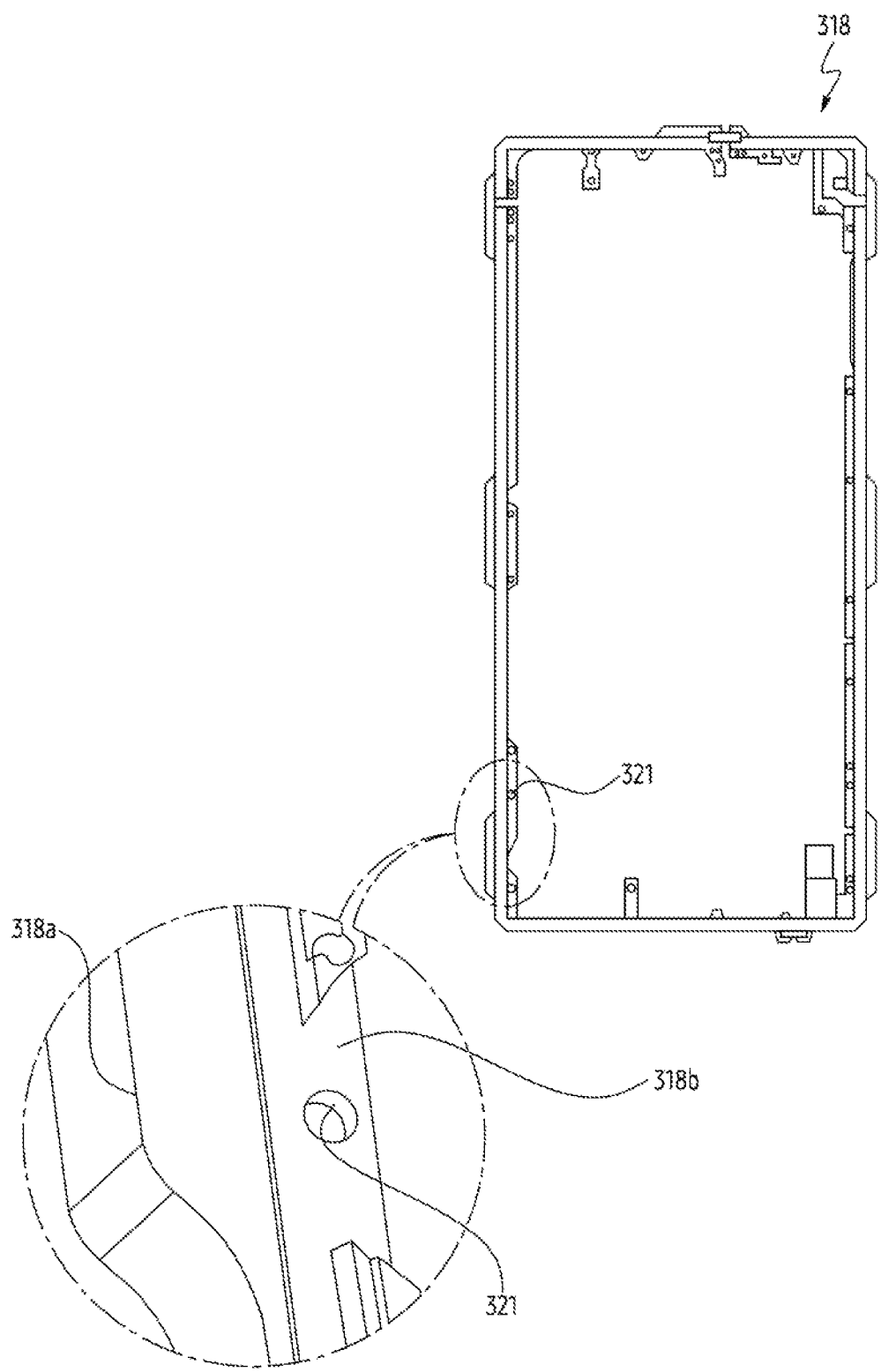
FIG. 5B is a plan view of a side bezel structure of an exemplary electronic device.
Figure 5C:
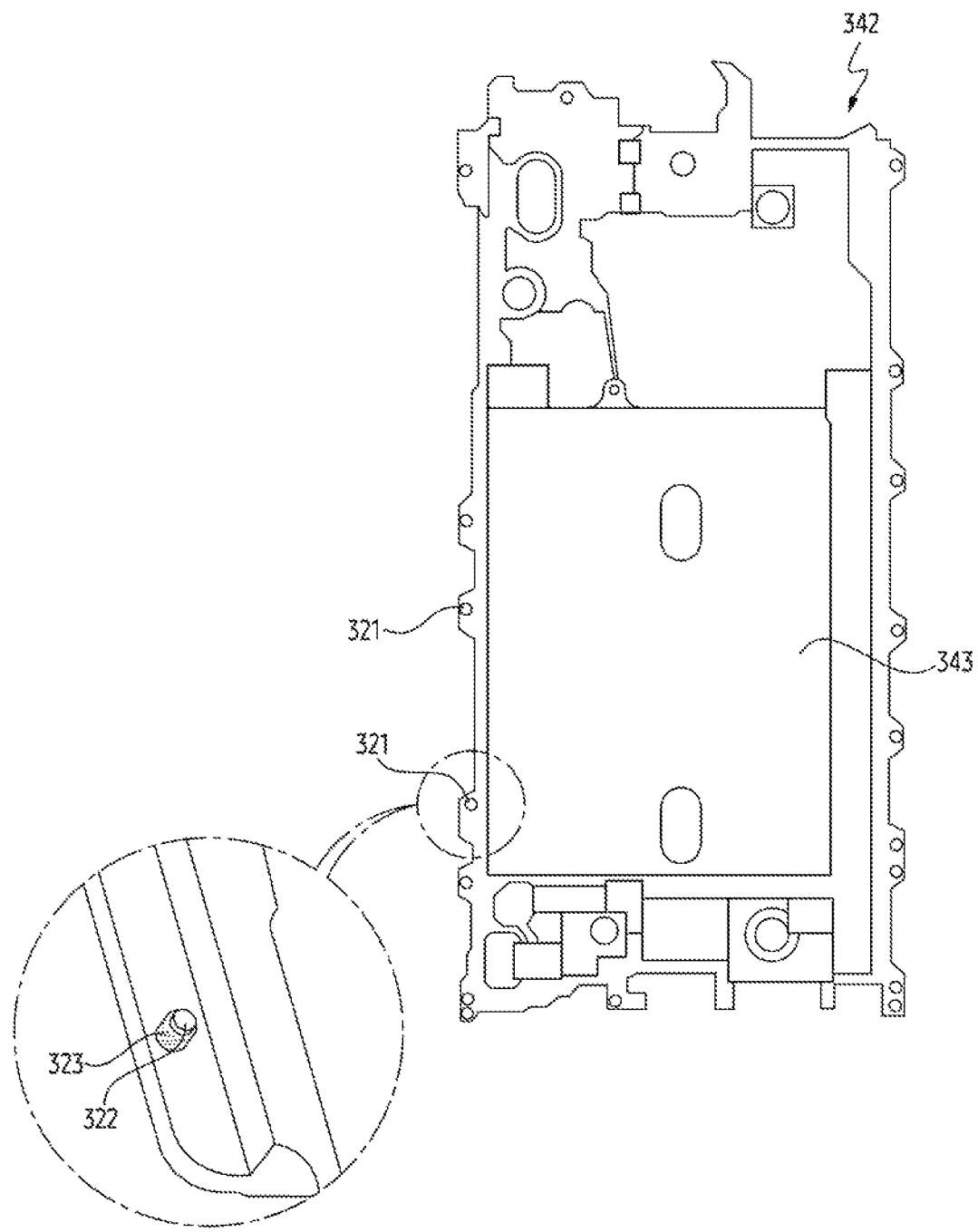
FIG. 5C is a plan view of a plate of an exemplary electronic device.

FIG. 5A illustrates a state in which a side bezel structure of an exemplary electronic device and a plate are coupled to each other. FIG. 5B is a plan view of a side bezel structure of an exemplary electronic device. FIG. 5C is a plan view of a plate of an exemplary electronic device.

Referring to FIGS. 5A to 5C, according to an embodiment, the electronic device 101 may include a side bezel structure 318, a plate 342, and a conductive adhesive member 323. According to an embodiment, the side bezel structure 318 and the plate 342 may be coupled to each other. The side bezel structure 318 and the plate 342 coupled to each other may form a part of the housing 310 of the electronic device 101.

According to an embodiment, the side bezel structure 318 may form a side surface of the electronic device 101. For example, the side bezel structure 318 may be coupled to the first plate (e.g., the front plate 302 of FIG. 3) and/or the second plate (e.g., the rear plate 311 of FIG. 3) to form at least a part of the side surface of the electronic device 101. According to an embodiment, the side bezel structure 318 may be include a speaker hole 307 for providing an audio signal to the outside of the electronic device 101, a connector hole 308 capable of accommodating the connector of the external electronic device 101, and/or a hole 309 into which an electronic pen may be inserted.

Referring to FIG. 5B, the side bezel structure 318 may include a through hole 321. For example, the through hole 321 may be disposed within a specified distance from the peripheries of the side bezel structure 318. For example, the through hole 321 may include a plurality of through holes spaced apart from each other along the peripheries of the side bezel structure 318.

According to an embodiment, the plate 342 may support components of the electronic device 101 disposed inside and/or outside the housing 310. According to an embodiment, the plate 342 may include a support portion 343 disposed in the housing 310. The support portion 343 may be referred to as a support member within the housing 310 that supports components of the electronic device 101. For example, the support portion 343 may support a battery (e.g., the battery 370 of FIG. 3), a printed circuit board (e.g., the first printed circuit board 350 of FIG. 3), and/or a camera module (e.g., the second camera module 312 of FIG. 3).

Referring to FIG. 5C, the plate 342 may include a protrusion portion 322. The protrusion portion 322 may have a shape corresponding to the shape of the through hole 321 while being inserted into the through hole 321. For example, the protrusion portion 322 may include a plurality of protrusion portions spaced apart from each other along the circumference of the support portion 343. Each of the plurality of protrusion portions may be disposed at positions corresponding to positions of the plurality of through holes so as to be inserted into a plurality of through holes of the side bezel structure 318. A plurality of protrusion portions may be inserted into a plurality of through holes to couple the plate 342 to the side bezel structure 318.

According to an embodiment, the side bezel structure 318 and the plate 342 may be coupled to each other to form a part of the housing 310. According to an embodiment, the protrusion portion 322 disposed on the plate 342 may be inserted into the through hole 321 disposed on the side bezel structure 318. In a state in which the side bezel structure 318 and the plate 342 are coupled, the protrusion portion 322 may extend from the support portion 343 into the through hole 321. The side bezel structure 318 and the plate 342 may be physically coupled to each other by a coupling force between the through hole 321 and the protrusion portion 322. After the side bezel structure 318 and the plate 342 are coupled, a support portion 319 of a polymer material may be formed along at least a part of the coupled portion. The support portion 319 may include polycarbonate (PC) and/or polyphthalamide (PPA), but is not limited thereto. According to an embodiment, in a state in which a part of the housing 310 is formed by combining the side bezel structure 318 and the plate 342, the side bezel structure 318 may be combined with the first plate and/or the second plate. The side bezel structure 318, the first plate, and/or the second plate may form the housing 310 of the electronic device 101.

According to an embodiment, the side bezel structure 318 and the plate 342 may include a metal material to provide rigidity of the housing 310. According to an embodiment, the side bezel structure 318 and the plate 342 may include different metal materials. According to an embodiment, the side bezel structure 318 may include a first metal. The plate 342 may include a second metal different from the first metal. In a state in which the side bezel structure 318 and the plate 342 are coupled to form the housing 310, the side bezel structure 318 may be exposed to the outside of the electronic device 101. For example, the side bezel structure 318 may form the side surface of the electronic device 101 in a state of being coupled to the first plate and/or the second plate. Since the side bezel structure 318 is exposed to the outside of the electronic device 101, it may include a metal material having high hardness. For example, the first metal may include titanium (Ti) and/or stainless steel, but is not limited thereto. In a state in which the side bezel structure 318 and the plate 342 are coupled to form the housing 310, the plate 342 may be disposed inside the electronic device 101. For example, the plate 342 may not be exposed to the outside of electronic device 101. Since the plate 342 is not exposed to the outside of the electronic device 101, the plate 342 may include a metal material having relatively low hardness. For example, the second metal may include aluminum (Al) and/or magnesium (Mg), but is not limited to thereto. According to an embodiment, the second hardness of the second metal may be lower than the first hardness of the first metal.

According to an embodiment, the conductive adhesive member 323 may be disposed between the through hole 321 and the protrusion portion 322. The conductive adhesive member 323 may couple the through hole 321 and the protrusion portion 322. According to an embodiment, the conductive adhesive member 323 may be applied to the outer surface of the protrusion portion 322 before the plate 342 is coupled to the side bezel structure 318. In a state in which the conductive adhesive member 323 is applied to the outer surface of the protrusion portion 322, the protrusion portion 322 may be inserted into the through hole 321. According to an embodiment, the conductive adhesive member 323 may include a conductive material. For example, the conductive adhesive member 323 may include silver having high electrical conductivity, but is not limited thereto.

Referring to FIG. 5A, according to an embodiment, the electronic device 101 may further include a wireless communication circuit configured to wirelessly communicate with the external electronic device 101 (e.g., the wireless communication module 192 of FIG. 1). According to an embodiment, the side bezel structure 318 may include a plurality of conductive portions and non-conductive portions disposed between the plurality of conductive portions. For example, the side bezel structure 318 may include a conductive portion 318-1 and non-conductive portions 318-2 and 318-3 in contact with the conductive portion 318-1. The conductive portion 318-1 may include a first metal having a first hardness. The conductive portion 318-1 may be formed on at least a portion of the first body 318a and/or at least a portion of the second body 318b. For example, the side bezel structure 318 may include a conductive portion 318-1 disposed on a portion of a side surface in the +y direction and a portion of a side surface in the −x direction of the side bezel structure 318, a first non-conductive portion 318-2 in contact with one end disposed on a side surface in the +y direction of the side bezel structure 318 among both ends of the conductive portion 318-1, and a second non-conductive portion 318-3 in contact with the other end disposed on the side surface of the side bezel structure 318 in the −x direction among both ends of the conductive portion 318-1. However, the above-described arrangement of the conductive portion 318-1 and the non-conductive portions 318-2 and 318-3 is only exemplary, and is not limited to the above structure.

According to an embodiment, the wireless communications circuit 192 may be operatively coupled to at least one conductive portion of the plurality of conductive portions. The wireless communications circuit 192 may be operatively coupled to the conductive portion 318-1. The conductive portion 318-1 may be fed from the wireless communication circuit 192 and operate as an antenna capable of transmitting and/or receiving a wireless signal of a designated frequency band. The conductive portion 318-1 may include a ground point that is electrically connected to a ground area within the housing 310. For example, the ground area may be located on the support portion 343 of the plate 342.

According to an embodiment, the wireless communication circuit 192 may be configured to wirelessly communicate with the external electronic device 101 through the conductive portion 318-1. According to an embodiment, the wireless communication circuit 192 may be configured to transmit and/or receive a wireless communication signal of a designated band by feeding power to a feed point of the conductive portion 318-1. According to an embodiment, in a state where the side bezel structure 318 and the plate 342 are coupled to each other, the conductive portion 318-1 may operate as an antenna capable of transmitting and/or receiving wireless communication signals. For example, the wireless communication circuit 192 may include a communication processor for wireless communication, a RFIC, and/or a RFEE. According to an embodiment, the communication processor may control other hardware components included in the wireless communication circuit 192 for transmission and/or reception of a wireless signal between the electronic device 101 and the external electronic device 101 distinguished from the electronic device 101. For example, in response to receiving a request to transmit data from at least one processor to the external electronic device 101, the communication processor may output an electrical signal (e.g., a digital data signal) having a base-band frequency band based on the data to the RFIC. According to an embodiment, the RFIC may up-convert a base band signal generated by a communication processor into a signal of a designated frequency band. When the wireless signal is received, the wireless signal may be obtained through the conductive portion 318-1 and pre-processed through RFFE. The RFIC may down-convert the pre-processed wireless signal to a base band signal for processing by the communications processor.

When the conductive portion 318-1 is operated as an antenna, an electrical signal (e.g., current) may flow through the conductive portion 318-1. The through hole 321 may be formed in the conductive portion 318-1. When a gap is present between the through hole 321 and the protrusion portion 322, the gap may be filled with a material with low electrical conductivity (e.g., air). In case that a material with low electrical conductivity is present in the path of the electrical signal when the electrical signal flows along the conductive portion 318-1, resistance formed in the path of the electrical signal may be increased. The increase in resistance may cause a decrease in wireless communication performance of the electronic device 101. For example, an increase in resistance may cause a degradation in wireless signal performance due to loss of electrical signals.

According to an embodiment, the conductive adhesive member 323 may fill a gap between the through hole 321 and the protrusion portion 322 with a conductive material, by being disposed between the through hole 321 and the protrusion portion 322. Since the gap between the through hole 321 and the protrusion portion 322 is filled with a conductive material, the conductive adhesive member 323 may electrically connect the through hole 321 and the protrusion portion 322. The conductive adhesive member 323 may reduce an increase in resistance due to a gap between a coupling portion between the side bezel structure 318 and the plate 342 by including materials having relatively high electrical conductivity (e.g., silver, copper, aluminum). According to an embodiment, the conductive adhesive member 323 may reduce deterioration of wireless communication performance of the electronic device 101 by filling the gap between the through hole 321 and the protrusion portion 322 with a conductive material having high electrical conductivity.

Figure 6A:
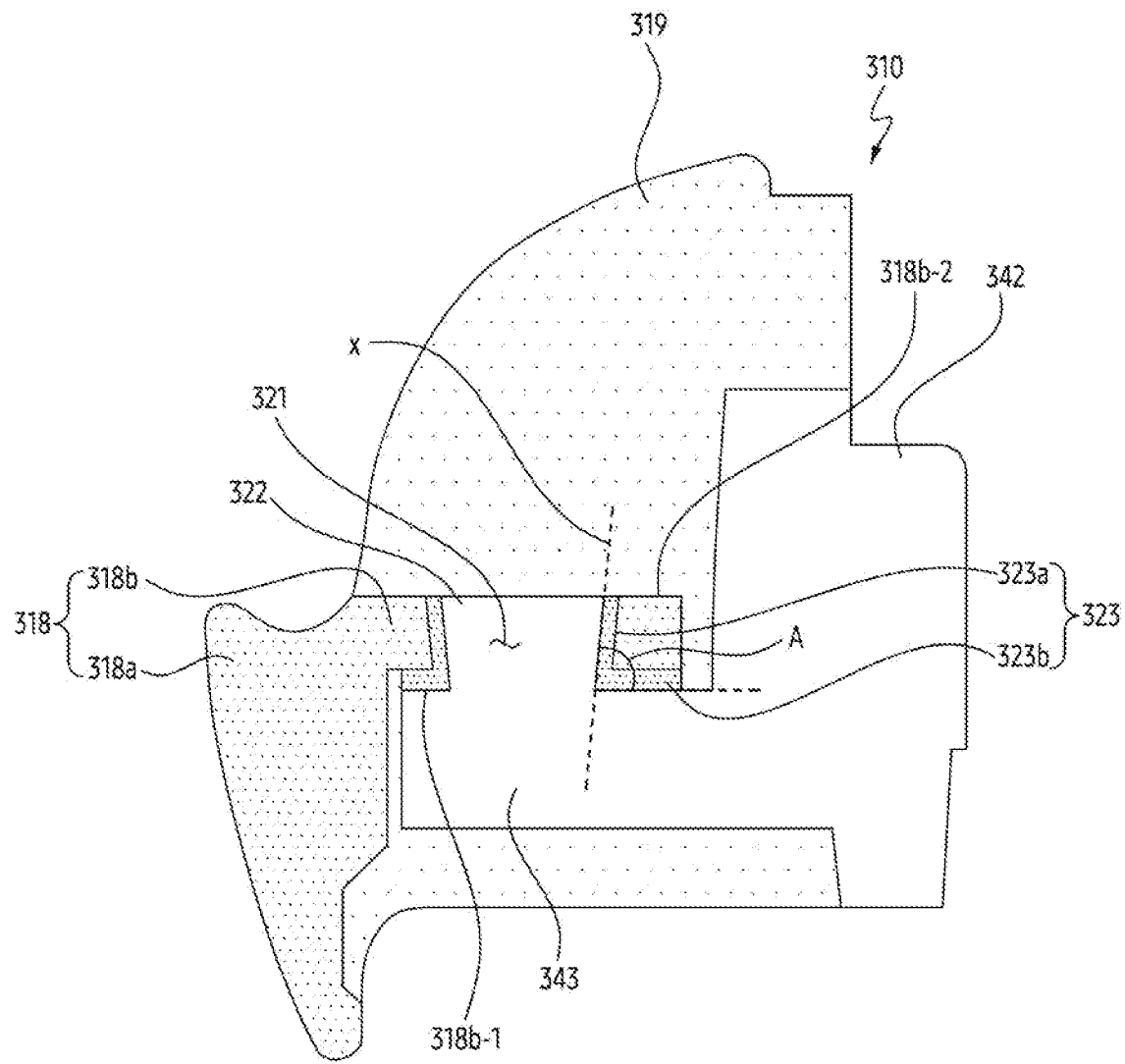
FIGS. 6A to 6C illustrate examples of cross-sections in which an exemplary electronic device is cut along A-A' of FIG. 5A.
Figure 6B:
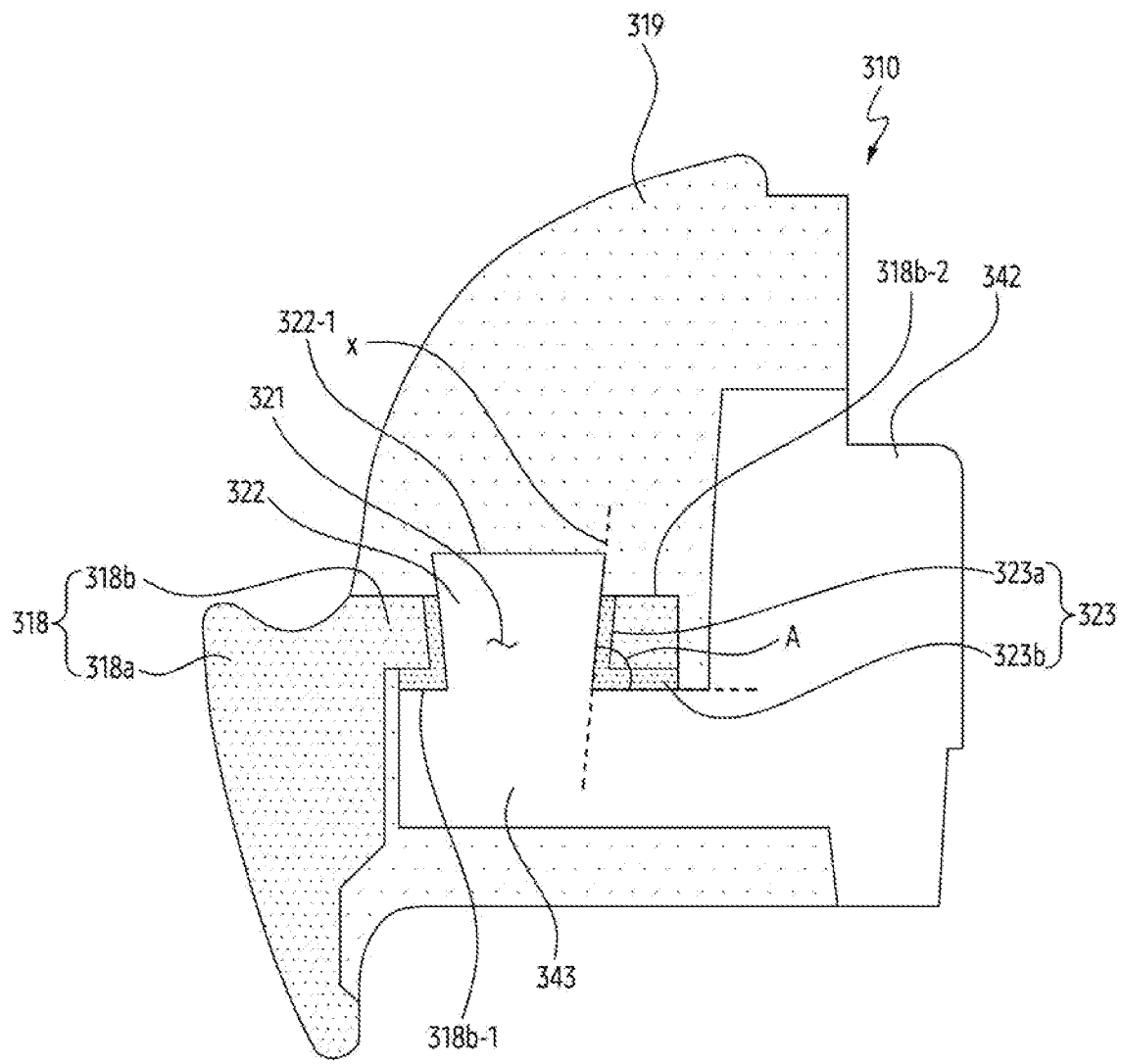
Figure 6C:
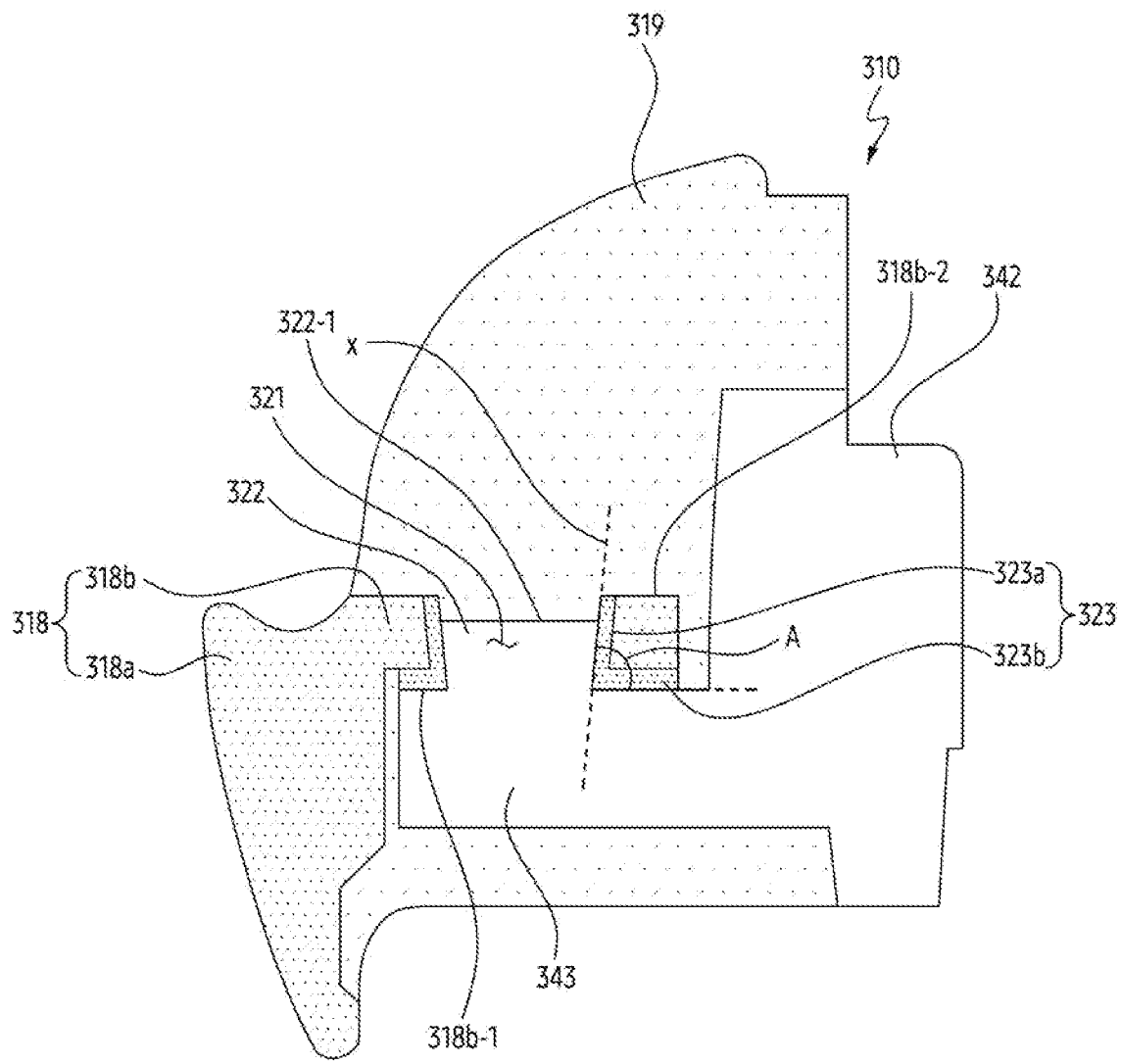

FIGS. 6A to 6C illustrate examples of cross-sections in which an exemplary electronic device is cut along A-A' of FIG. 5A.

Referring to FIG. 6A, the side bezel structure 318 may include a first body 318a surrounding at least a portion of the inner space of the electronic device 101 and a second body 318b extending from the first body 318a to the inner space and having a through hole 321.

According to an embodiment, the plate 342 may include a support portion 343 disposed in the inner space of the housing 310 and a protrusion portion 322 extending from the support portion 343 into the through hole 321.

According to an embodiment, the first body 318a may form a side surface of the housing 310. The second body 318b may extend from the first body 318a into the inner space of the housing 310. For example, the second body 318b may extend from the first body 318a in a first direction parallel to the support portion 343 (e.g., +x direction). A thickness t of the second body 318b may be smaller than that of the first body 318a. The through hole 321 may be formed by passing through the other surface 318b-2 of the second body 318b from one surface 318b-1 of the second body 318b facing the support portion 343. The other surface 318b-2 of the second body 318b may be opposite to the one surface 318b-1.

According to an embodiment, the through hole 321 may extend in a second direction (e.g., a +z direction) perpendicular to the first direction. The length of the through hole 321 may be defined by the thickness t of the second body 318b. For example, the thickness of the second body 318b may be about 0.8 mm. Since the length of the through hole 321 corresponds to the thickness of the second body 318b, the length of the through hole 321 may be about 0.8 mm. However, the numerical value may be changed according to the structure and/or design of the housing 310, and is not limited to the above-described numerical value.

According to an embodiment, the protrusion portion 322 may extend from the support portion 343 in the second direction (e.g., the +z direction). For example, the protrusion portion 322 may extend vertically with respect to a plane (e.g., an x-y plane) formed by the support portion 343. According to an embodiment, the plate 342 may be connected to the side bezel structure 318 in the second direction (e.g., the +z direction). For example, the protrusion portion 322 may be inserted in the second direction (e.g., the +z direction) into the through hole 321 of the second body 318b extending in the first direction (e.g., the +x direction). In a state where the side bezel structure 318 and the plate 342 are coupled, the shape of the protrusion portion 322 may correspond to the shape of the through hole 321.

According to an embodiment, the periphery of the support portion 343 may overlap the periphery of the second body 318b when the support portion 343 is viewed from above (e.g., when viewed in the −z direction). Since the protrusion portion 322 is disposed within an area including the periphery of the support portion 343, the second body 318b and the periphery of the support portion 343 may overlap each other when the protrusion portion 322 is inserted into the through hole 321. In a state where the protrusion portion 322 is inserted into the through hole 321, the conductive adhesive member 323 may fill a gap between the protrusion portion 322 and the through hole 321.

According to an embodiment, the second body 318b and the protrusion portion 322 may have different cross-sectional areas along the second direction (e.g., the +z direction). Referring to FIG. 6A, the cross-sectional area of the protrusion portion 322 in contact with one surface 318b-1 of the second body 318b facing the support portion 343 may be narrower than the cross-sectional area of the protrusion portion 322 in contact with another surface 318b-2 of the second body 318b, which is opposite to the one surface 318b-1 of the second body 318b. For example, the cross-sectional area of through hole 321 may increase along the second direction (e.g., the +z direction). The through hole 321 may not have a cylindrical shape extending in a straight line, but may have a truncated cone shape in which a cross-sectional area is increased along the second direction (e.g., the +z direction).

According to an embodiment, a cross-sectional area of the protrusion portion 322 at a point inserted into the through hole 321 may be the smallest among cross-sectional areas of the entire area of the protrusion portion 322. In a state where the side bezel structure 318 and the plate 342 are connected, the coupling force between the side bezel structure 318 and the plate 342 may be determined by the coupling force between the protrusion portion 322 and the through hole 321. When the through hole and the protrusion portion extend in parallel to the second direction (e.g., the +z direction), the cross-sectional area of the protrusion portion may be constant over the entire area.

When an external force is applied to the housing, the protrusion portion moves in a direction opposite to a direction (e.g., a −z direction) inserted into the through hole, thereby being relatively easily separated from the through hole. According to an embodiment, since the protrusion portion 322 has the smallest cross-sectional area at the point inserted into the through hole 321, the protrusion portion 322 may be difficult to separate from the through hole 321, in a state inserted into the through hole 321. According to an embodiment, since the cross-sectional areas of the through hole 321 and the protrusion portion 322 are the smallest at the point where the protrusion portion 322 is inserted into the through hole 321 even when an external force is applied to the housing 310, the protrusion portion 322 may not be moved in a direction opposite to the direction inserted into the through hole 321 (e.g., −z direction). According to the above-described structure, the coupling force between the side bezel structure 318 and the plate 342 may be improved.

According to an embodiment, the intersection angle (A) of the generatrix (X) of the protrusion portion 322 and the support portion 343 may be smaller than 90 degrees. The generatrix (X) may refer to a virtual straight line forming the outer surface of the protrusion portion 322. For example, the generatrix (X) may refer to an imaginary straight line extending perpendicularly to the circumferences forming the outer surface of the protrusion portion 322. Since the cross-sectional area of the protrusion portion 322 may have different cross-sectional areas at different points distinguished with respect to the second direction (e.g., +z direction), the generatrix (X) of the protrusion portion 322 may extend toward the same center. The intersection angle (A) may mean an angle between a generatrix (X) and the support portion 343 contacting an end of the generatrix (X).

Since the cross-sectional area of the protrusion portion 322 may have different cross-sectional areas at different points distinguished with respect to the second direction (e.g., +z direction), an intersection angle (A) between the generatrix (X) of the protrusion portion 322 and the support portion 343 may be less than 90 degrees. According to an embodiment, the intersection angle (A) of the generatrix (X) of the protrusion portion 322 and the support portion 343 may be about 81 degrees to about 87 degrees. Since the change in cross-sectional area along the second direction (e.g., +z direction) in which the protrusion portion 322 extends is too large in case that the intersection angle (A) is less than about 81 degrees, it may be difficult to match the shape of the protrusion portion 322 to the shape of the through hole 321. For example, the shape of the protrusion portion 322 may correspond to the shape of the through hole 321, by pressing the protrusion portion 322 exposed to the outside of the through hole 321 with a press after inserting the protrusion portion 322 into the through hole 321.

Since the protrusion portion 322 exposed to the outside of the through hole 321 is pressed by the press, the shape of the protrusion portion 322 may be deformed. Since the protrusion portion 322 needs to be deformed relatively a lot to fill the through hole 321 by pressing the protrusion portion 322 in case that the intersection angle (A) is less than about 81 degrees, it may be difficult to fill the through hole 321 as a whole. Since the cross-sectional area of the through hole 321 formed on the other surface 318b-2 of the second body 318b is increased in case that the intersection angle (A) is less than about 81 degrees, the length of the second body 318b may be increased. When the length of the second body 318b is increased, the length of the side bezel structure 318 in the +x direction and the -x direction is increased, and thus the volume of the inner space of the housing 310 may be reduced. Since the cross-sectional area of the protrusion portion 322 is substantially constant over the entire area in case that the intersection angle (A) is greater than about 87 degrees, the protrusion portion 322 may be separated from the through hole 321 relatively easily.

According to an embodiment, when the intersection angle (A) is about 81 degrees to about 87 degrees, the coupling force between the side bezel structure 318 and the plate 342 is improved, and the design and manufacturing process may be facilitated. According to an embodiment, since the side bezel structure 318 and the plate 342 may be firmly coupled, the electronic device 101 may stably transmit and/or receive wireless communication signals through the conductive portion 318-1 of the side bezel structure 318.

According to an embodiment, the conductive adhesive member 323 may be disposed between the side bezel structure 318 and the plate 342 to fill a gap between the side bezel structure 318 and the plate 342. According to an embodiment, the conductive adhesive member 323 may be disposed between the through hole 321 and the protrusion portion 322 and/or between the second body 318b and the support portion 343. Referring to FIG. 6A, the conductive adhesive member 323 may include a first portion 323a disposed between the through hole 321 and the protrusion portion 322 and/or a second portion 323b disposed between the second body 318b and the support portion 343.

The conductive adhesive member 323 may include a portion disposed between the first body 318a and the support portion 343. The first portion 323a may couple the through hole 321 and the protrusion portion 322. The second portion 323b may couple the second body 318b and the support portion 343. The conductive adhesive member 323 may improve physical coupling force between the side bezel structure 318 and the plate 342. The conductive adhesive member 323 may reduce resistance that may cause loss of electrical signals, by filling the gap that may be formed between the side bezel structure 318 and the plate 342 with a material having high electrical conductivity.

For example, when air having a relatively low electrical conductivity is filled in the gap between the side bezel structure 318 and the plate 342, electrical signals may be lost. When the electronic device 101 transmits or receives a wireless communication signal through the conductive portion 318-1, the wireless communication performance may deteriorate due to the electrical signal loss. The conductive adhesive member 323 may improve performance of a wireless communication signal of the electronic device 101 according to an embodiment, by providing a coupling force between the side bezel structure 318 and the plate 342 and filling the gap between the side bezel structure 318 and the plate 342 with a material having high electrical conductivity.

According to an embodiment, since the protrusion portion 322 is pressed after being inserted into the through hole 321, a shape of the protrusion portion 322 may correspond to a shape of the through hole 321. While pressing the protrusion portion 322, the shape of the protrusion portion 322 may be different based on the tolerance of the protrusion portion 322 and/or the tolerance of the through hole 321. For example, the end 322-1 of the protrusion portion 322 may be exposed to the outside of the through hole 321 or disposed inside the through hole 321. For example, referring to FIG. 6B, the end 322-1 of the protrusion portion 322 may protrude from the through hole 321 and be exposed on the second body 318b. For example, referring to FIG. 6C, the end 322-1 of the protrusion portion 322 may be located inside the through hole 321.

Figure 7:
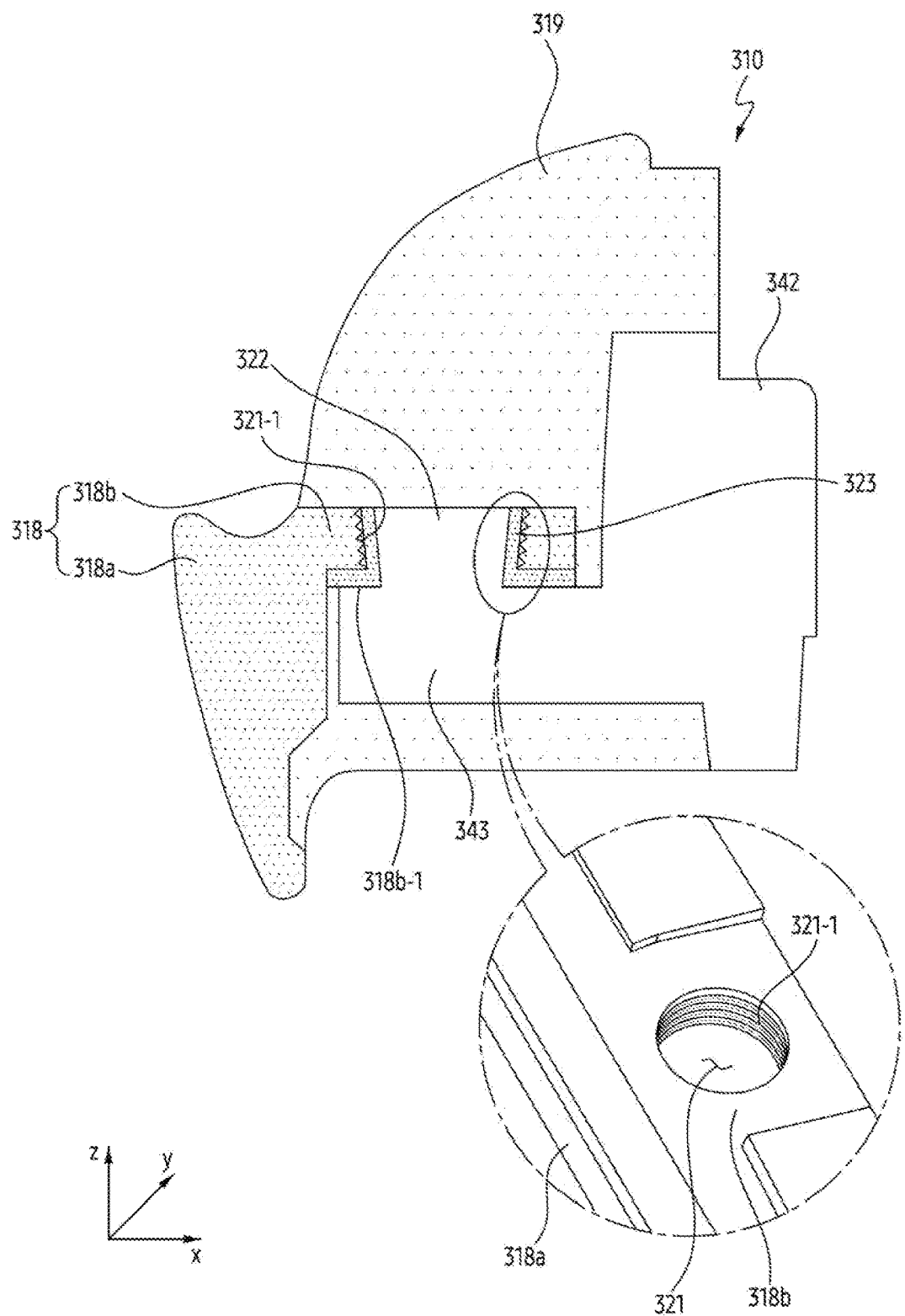
FIG. 7 is a cross-sectional view of an exemplary electronic device cut along A-A' of FIG. 5A.

FIG. 7 is a cross-sectional view of an exemplary electronic device cut along A-A' of FIG. 5A.

Referring to FIG. 7, an inner circumferential surface 321-1 of the through hole 321 may have roughness to increase a contact surface with the protrusion portion 322. When the inner circumferential surface 321-1 of the through hole 321 has roughness, the contact surface between the protrusion portion 322 and the through hole 321 may be increased. For example, unevenness formed on the inner circumferential surface 321-1 of the through hole 321 may increase an area of the through hole 321 in contact with the protrusion portion 322. In one embodiment, the inner circumferential surface 321-1 of the through hole 321 may be uneven and may be in contact with the protruding portion 322.

According to an embodiment, the side bezel structure 318 may form roughness on the inner circumferential surface 321-1 of the through hole 321 through a surface treatment process of the through hole 321 before being coupled with the plate 342. According to an embodiment, the inner circumferential surface 321-1 of the through hole 321 may have roughness through a blasting processing or a tap processing.

According to an embodiment, the roughness of the inner circumferential surface 321-1 of the through hole 321 may be increased through a blasting processing (e.g., bead blasting) or a tap processing. Before performing the blasting processing, the roughness of the inner circumferential surface 321-1 of the through hole 321 may be about 0.722 µm, but after performing the blasting processing, the roughness of the inner circumferential surface 321-1 of the through hole 321 may be about 0.857 µm. Before performing the blasting processing, the expansion area ratio of the inner circumferential surface 321-1 of the through hole 321 may be about 29.6%, but after performing the blasting processing, the expansion area ratio of the inner circumferential surface 321-1 of the through hole 321 may be about 32.7%.

According to an embodiment, the roughness of the inner circumferential surface 321-1 of the through hole 321 may be increased by about 0.135 Vim through the blasting processing. According to an embodiment, the expansion area ratio of the inner circumferential surface 321-1 of the through hole 321 may be increased by about 10.5% through the blasting processing. Before performing tap processing, the surface area of the inner circumferential surface 321-1 of the through hole 321 may be about 2.55 mm2, but after performing the tap processing, the surface area of the inner circumferential surface 321-1 of the through hole 321 may be about 2.98 mm2. According to an embodiment, the surface area of the inner circumferential surface 321-1 of the through hole 321 may be increased by about 17% through tap processing.

According to an embodiment, the conductive adhesive member 323 may be disposed between the through hole 321 and the protrusion portion 322. When the through hole 321 has roughness and the expansion area ratio increases, the conductive adhesive member 323 may firmly couple the through hole 321 and the protrusion portion 322. Since the inner circumferential surface 321-1 of the through hole 321 has high illuminance, an adhesive effect of the conductive adhesive member 323 providing coupling between the through hole 321 and the protrusion portion 322 may be increased.

According to an embodiment, the surface area of the through hole 321 may be increased by forming roughness on the inner circumferential surface 321-1 of the through hole 321. Since the surface area of the through hole 321 is increased when the protrusion portion 322 is inserted into the through hole 321, an area of a contact surface between the through hole 321 and the protrusion portion 322 may be increased. Since the area of the contact surface is increased, the coupling force between the protrusion portion 322 and the through hole 321 may be increased.

According to an embodiment, since the coupling force between the protrusion portion 322 and the through hole 321 is high, the coupling between the protrusion portion 322 and the through hole 321 may be firmly maintained even when an external force is applied. According to an embodiment, degradation of antenna performance due to separation of the protrusion portion 322 and the through hole 321 may be reduced. According to an embodiment, the electronic device 101 may constantly maintain wireless communication performance.

According to an embodiment, the side bezel structure 318 and the plate 342 may include different metal materials. The hardness of the first metal included in the side bezel structure 318 may be higher than the hardness of the second metal included in the plate 342. A higher hardness metal may be heavier than a lower hardness metal. A higher hardness metal may be more expensive than a lower hardness metal.

According to an embodiment, the side bezel structure 318 exposed to the outside of the electronic device 101 may include a relatively heavy and expensive first metal, and the plate 342 that is not exposed to the outside of the electronic device 101 may include a relatively light and cheap second metal. According to an embodiment, when components composed of different metal materials are coupled (e.g., rivet joint), the coupling force may be weakened due to different physical and/or chemical properties. For example, when the side bezel structure 318 and the plate 342 including different metals are coupled to each other, the contact surface may be separated due to a difference in thermal expansion coefficient of the metals. In case that the contact surface is not firmly formed, antenna performance of the conductive portion 318-1 may deteriorate.

According to an embodiment, the electronic device 101 may improve coupling force between the through hole 321 and the protrusion portion 322 through the above-described cross-sectional structure of the protrusion portion 322, the conductive adhesive member 323, and/or the roughness of the through hole 321. According to an embodiment, the increase in coupling force between the through hole 321 and the protrusion portion 322 may increase the coupling force between the plate 342 and the side bezel structure 318 including different metals.

For example, even when a difference between the coefficient of thermal expansion of the first metal and the coefficient of thermal expansion of the second metal exists, the through hole 321 and the protrusion portion 322 may be firmly coupled without separation. According to an embodiment, the electronic device 101 may constantly maintain transmission and/or reception performance of a wireless communication signal through a stable coupling between the side bezel structure 318 and the plate 342.

Figure 8A:
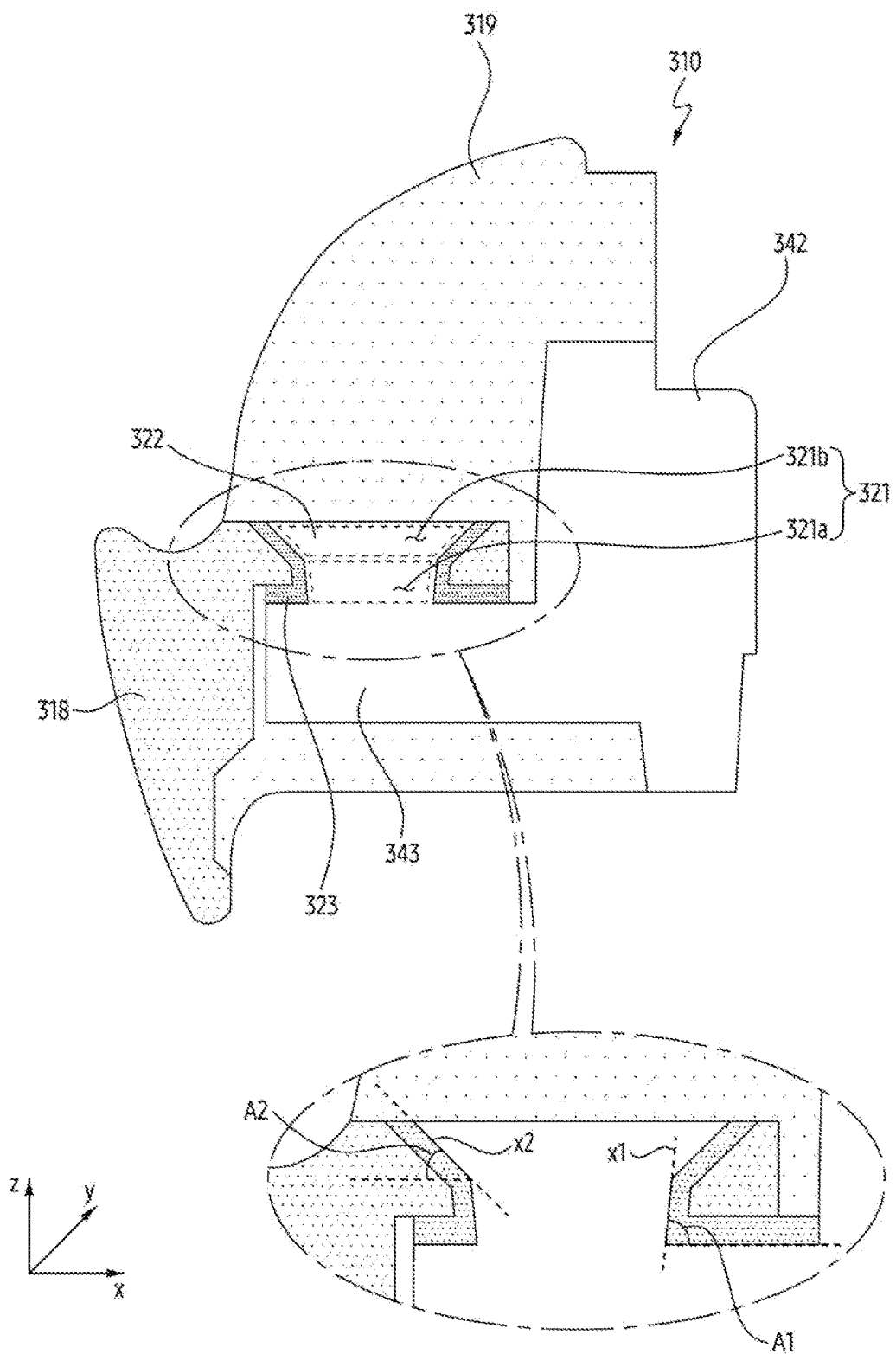
FIGS. 8A, 8B, and 8C illustrate examples of cross-sections in which an exemplary electronic device is cut along A-A' of FIG. 5A.
Figure 8B:
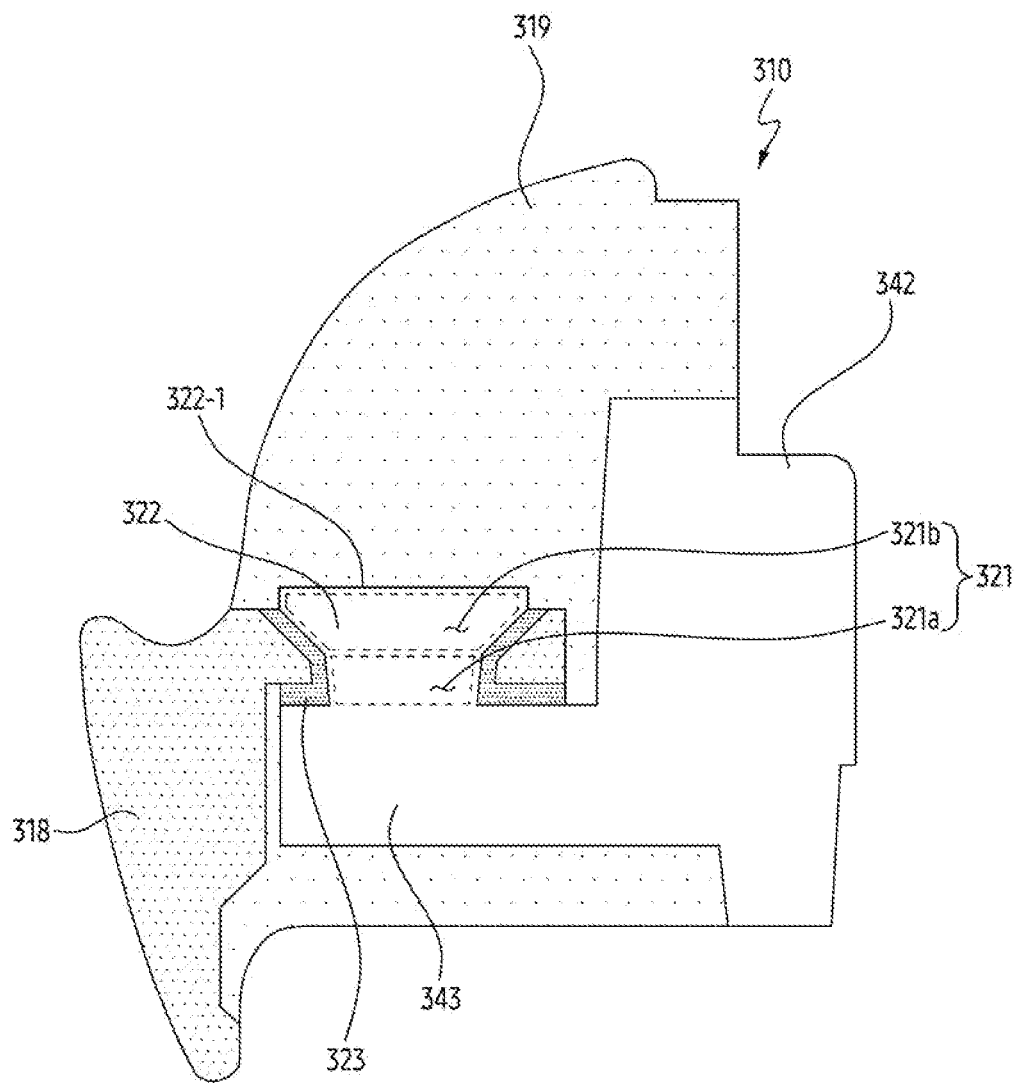
Figure 8C:
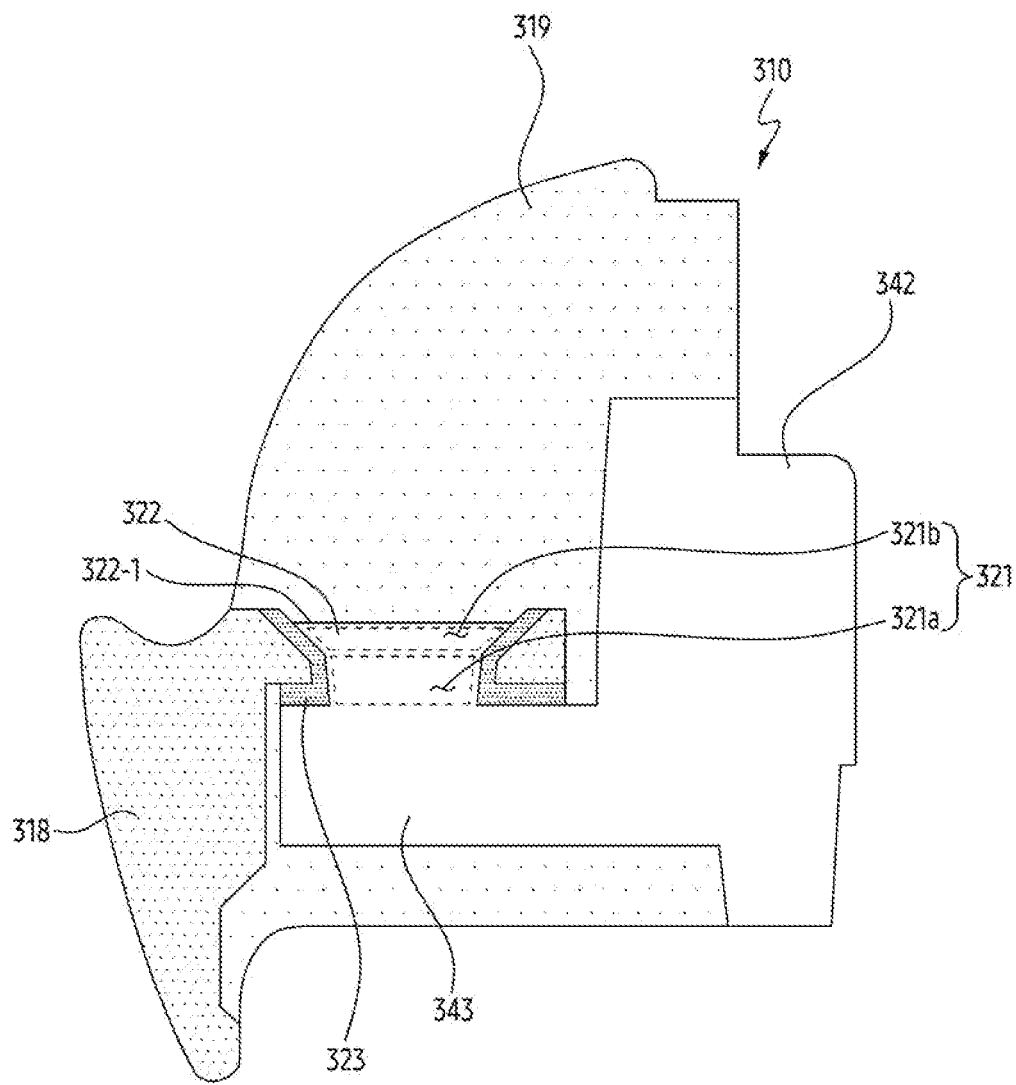

FIGS. 8A, 8B, and 8C illustrate examples of cross-sections in which an exemplary electronic device is cut along A-A' of FIG. 5A.

Referring to FIG. 8A, the through hole 321 may include a first region 321a in contact with the support portion 343 and a second region 321b extending from the first area 321a, in a direction in which the protrusion portion 322 extends (e.g., in the +z direction) from the support portion 343. In a state in which the protrusion portion 322 is inserted into the through hole 321, the first region 321a may be in contact with the support portion 343. In this state, the second region 321b may extend in the direction from the first region 321a. The protrusion portion 322 may be inserted into the first region 321a. The protrusion portion 322 may pass through the first region 321a and extend to the second region 321b. A shape of the protrusion portion 322 may correspond to a shape of the through hole 321.

According to an embodiment, a shape of a part of the protrusion portion 322 disposed within the first region 321a among the protrusion portion 322 may correspond to the shape of the first region 321a. A shape of another part of the protrusion portion 322 disposed within the second region 321b among the protrusion portion 322 may correspond to the shape of the second region 321b.

Referring to FIG. 8A, the cross-sectional area of the first region 321a and the cross-sectional area of the second region 321b may increase along a direction in which the protrusion portion 322 extends (e.g., +z direction). For example, the diameter of the through hole 321 may increase along the above direction.

According to an embodiment, an increase rate of the cross-sectional area along the direction in the first region 321a may be smaller than an increase rate of the cross-sectional area along the direction in the second region 321b.

According to an embodiment, a first intersection angle A1 between the first generatrix X1 and the support portion 343 of the protrusion portion 322 disposed in the first area 321a may be larger than a second intersection angle A2 between the second generatrix X2 and the support portion 343 of the protrusion portion 322 disposed in the second area 321b.

According to an embodiment, coupling force between the protrusion portion 322 and the through hole 321 may be increased through the first intersection angle A1 and the second intersection angle A2 smaller than the first intersection angle A1. Compared to the case where the intersection angle of the generatrix and the support portion 343 is constant in the entire area of the protrusion portion 322, a contact surface between the through hole 321 and the protrusion portion 322 may be increased, in the structure described above. According to an embodiment, as the contact surface increases, the area of the conductive adhesive member 323 disposed between the protrusion portion 322 and the through hole 321 may increase. An effect of increasing coupling force between the side bezel structure 318 and the plate 342 may be improved by the conductive adhesive member 323.

According to an embodiment, since the second intersection angle A2 is smaller than the first intersection angle A1 even when an external force is applied to the side bezel structure 318 and the plate 342, the protrusion portion 322 may be difficult to separate from the through hole 321. According to an embodiment, since the side bezel structure 318 and the plate 342 are firmly coupled to each other, performance of a wireless communication signal through the conductive portion 318-1 may be maintained constantly.

According to an embodiment, a first intersection angle (A1) between the first generatrix X1 and the support portion 343 of the protrusion portion 322 disposed in the first region 321a may be between about 81 degrees and about 87 degrees. A second intersection angle (A2) between the second generatrix X2 and the support portion 343 of the protrusion portion 322 disposed in the second region 321b may be between about 60 degrees and about 80 degrees. A difference between the first intersection angle A1 and the second intersection angle A2 may be about 9 degrees to about 27 degrees. Since the cross-sectional area difference between the first region 321a and the second region 321b is too large when the second intersection angle A2 is less than about 60 degrees, the protrusion portion 322 may be difficult to be inserted into the through hole 321. Since the cross-sectional area difference between the first region 321a and the second region 321b is too small when the second intersection angle A2 is greater than 80 degrees, the effect of increasing the coupling force may be small. According to an embodiment, when the second intersection angle A2 is between about 60 degrees and about 80 degrees, the coupling force between the side bezel structure 318 and the plate 342 may be improved.

According to an embodiment, since the protrusion portion 322 is pressed after being inserted into the through hole 321, the shape of the protrusion portion 322 may correspond to the shape of the through hole 321. While pressing the protrusion portion 322, the shape of the protrusion portion 322 may be different based on the tolerance of the protrusion portion 322 and/or the tolerance of the through hole 321.

For example, the end 322-1 of the protrusion portion 322 may be exposed to the outside of the through hole 321 or disposed inside the through hole 321. For example, referring to FIG. 8B, the end 322-1 of the protrusion portion 322 may protrude from the through hole 321 and be exposed on the second body 318b. For example, referring to FIG. 8C, the end 322-1 of the protrusion portion 322 may be located inside the through hole 321.

Figure 9A:
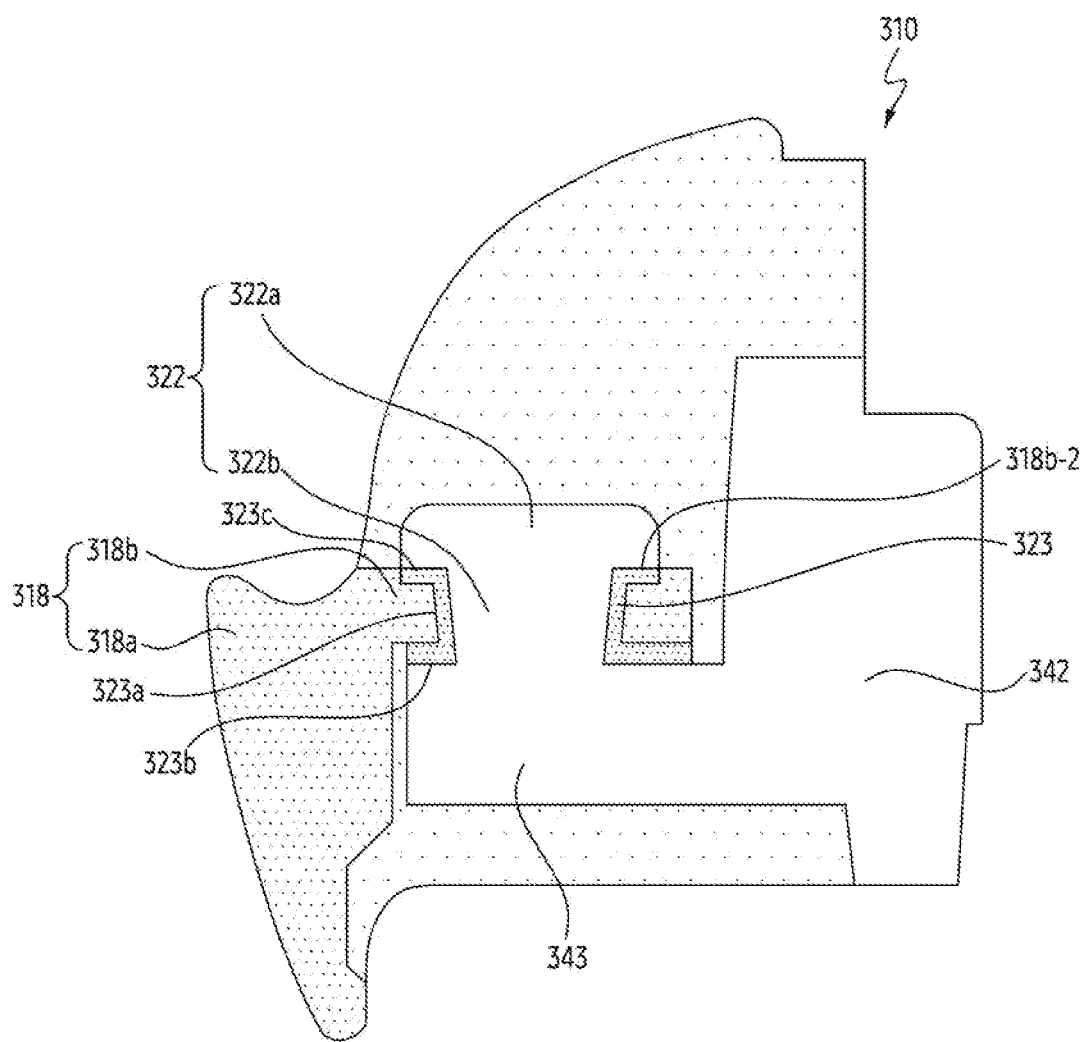
FIGS. 9A, 9B, and 9C illustrate examples of cross-sections in which an exemplary electronic device is cut along A-A' of FIG. 5A.
Figure 9B:
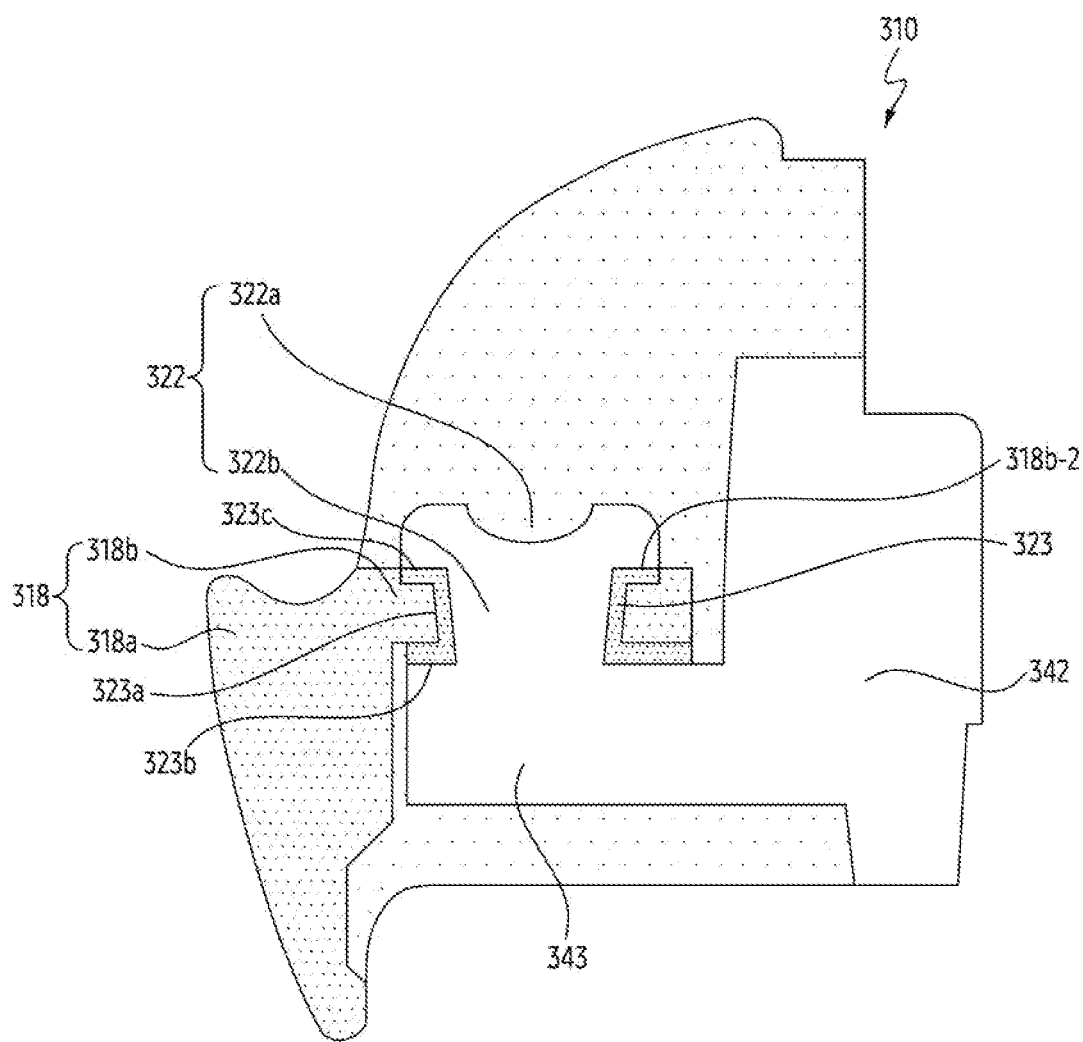
Figure 9C:
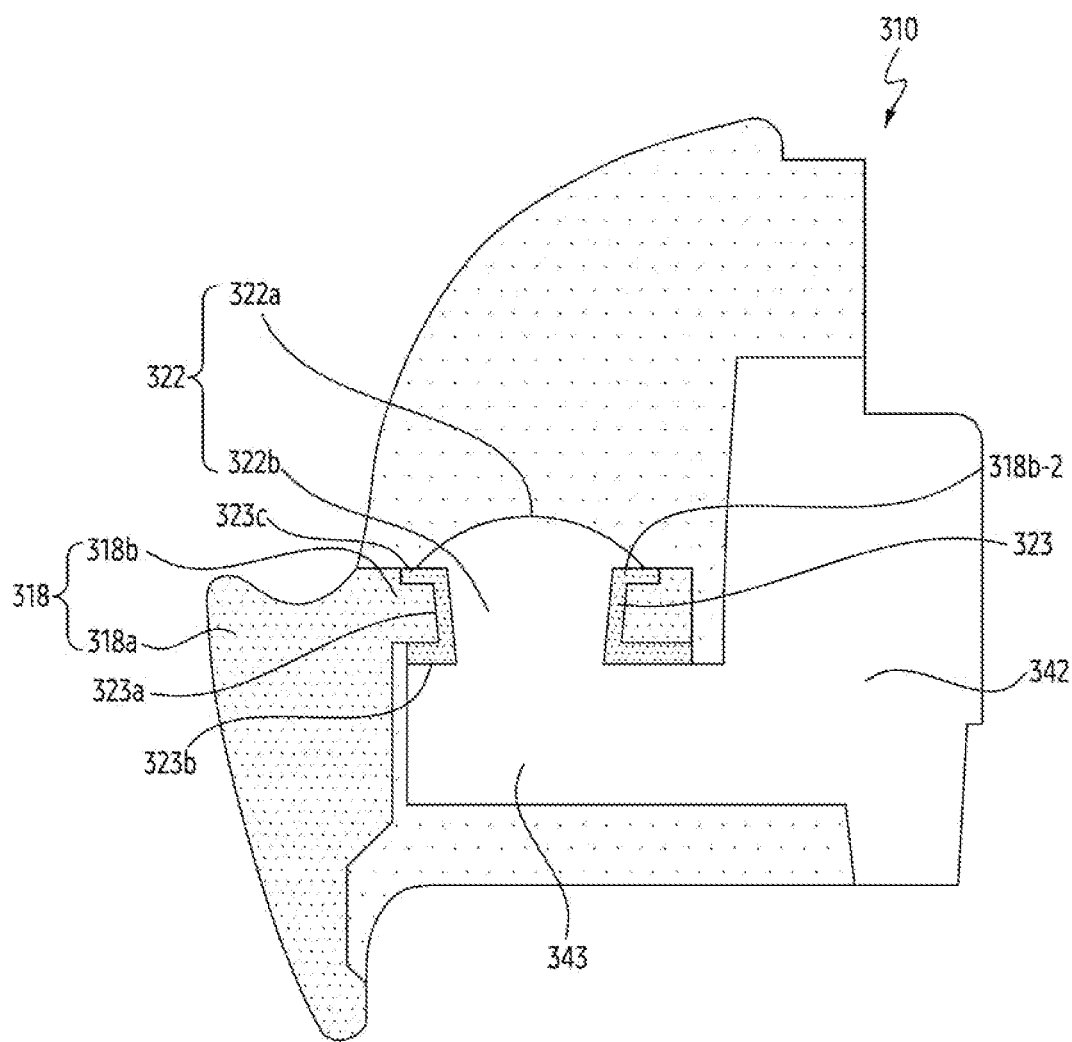

FIGS. 9A, 9B, and 9C illustrate examples of cross-sections in which an exemplary electronic device is cut along A-A' of FIG. 5A.

Referring to FIG. 9A, the protrusion portion 322 may include a head 322a disposed on another surface 318b-2 of the second body 318b. The head 322a may cover the through hole 321 formed on the other surface 318b-2 of the second body 318b.

According to an embodiment, the protrusion portion 322 may include a body 322b disposed in the through hole 321 and a head 322a extending from the body 322b and disposed on the other surface 318b-2 of the second body 318b. The head 322a may cover the through hole 321 by covering a part of the other surface 318b-2 of the second body 318b. For example, the cross-sectional area of the head 322a disposed on the second body 318b may be larger than the cross-sectional area of the through hole 321 formed on the other surface 318b-2. When viewing the support portion 343 from above (e.g., looking in the −z direction), the through hole 321 may not be visually recognized by the head 322a.

According to an embodiment, since the cross-sectional area of the head 322a is larger than the cross-sectional area of the through hole 321, the protrusion portion 322 may be difficult to separate from the through hole 321 while being inserted into the through hole 321. The rest of the second body 318b except for the through hole 321 may restrict the movement of the head 322a. A remaining part of the second body 318b except for the through hole 321 may restrict movement of the head 322a.

For example, since the head 322a cannot be inserted into the through hole 321 even when an external force acts on the protrusion portion 322 in the direction of separation from the through hole 321 (e.g., −z direction) in the state where the protrusion portion 322 is inserted into the through hole 321, the protrusion portion 322 may not be separated from the through hole 321.

According to an embodiment, a conductive adhesive member 323 may be disposed between the head 322a and the second body 318b to couple the head 322a and the second body 318b. According to an embodiment, the conductive adhesive member 323 may be disposed between the through hole 321 and the protrusion portion 322 and/or between the head 322a and the second body 318b.

Referring to FIG. 9A, the conductive adhesive member 323 may include a first portion 323a disposed between the through hole 321 and the protrusion portion 322, a second portion 323b disposed between the second body 318b and the support portion 343, and/or a third portion 323c disposed between the head 322a and the second body 318b. The third portion 323c may couple the head 322a and the second body 318b. The third portion 323c may increase coupling force between the side bezel structure 318 and the plate 342 by coupling the head 322a to the second body 318b.

According to an embodiment, the shape of the head 322a may vary. For example, referring to FIG. 9A, the shape of the head 322a may be a plate shape substantially parallel to the second body 318b. For example, referring to FIG. 9B, the shape of the head 322a may be a streamlined shape with a part recessed. For example, referring to FIG. 9C, the shape of the head 322a may be a curved surface. However, it is not limited thereto.

Figure 10:
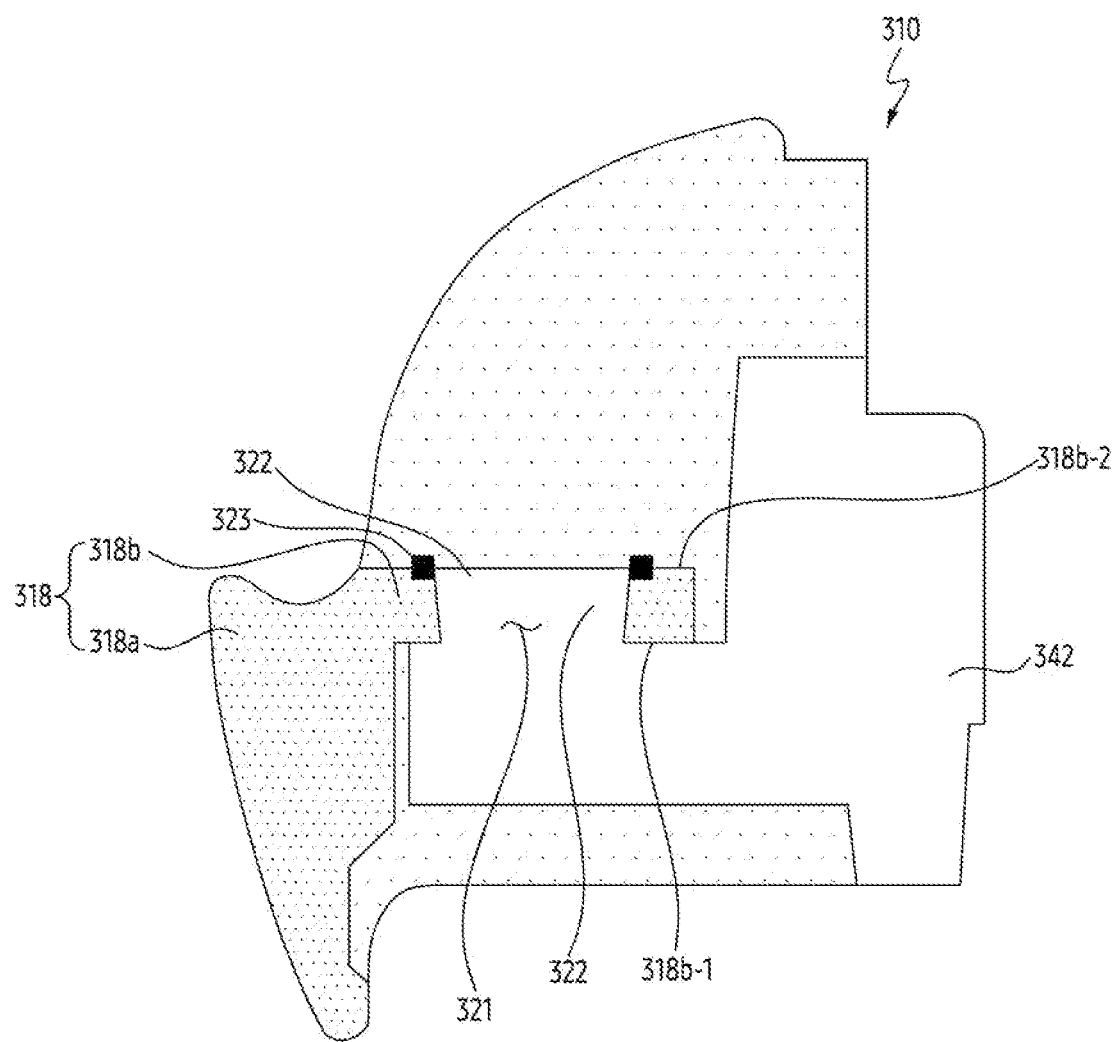
FIG. 10 is a cross-sectional view of an exemplary electronic device cut along A-A' of FIG. 5A.

FIG. 10 is a cross-sectional view of an exemplary electronic device cut along A-A' of FIG. 5A.

Referring to FIG. 10, the conductive adhesive member 323 may be disposed in a partial region between the through hole 321 and the protrusion portion 322. The conductive adhesive member 323 may be disposed between the through hole 321 and the protrusion portion 322 to improve coupling force between the side bezel structure 318 and the plate 342. It is not that the conductive adhesive member 323 is disposed over the entire area between the through hole 321 and the protrusion portion 322.

The conductive adhesive member 323 may be disposed only in a partial area between the through hole 321 and the protrusion portion 322 to provide a coupling force between the side bezel structure 318 and the plate 342. According to an embodiment, the conductive adhesive member 323 may have a certain thickness from a portion in contact with the other surface 318b-2 of the second body 318b, between the through hole 321 and the protrusion portion 322. However, it is not limited thereto. The conductive adhesive member 323 may have a certain thickness from a portion in contact with one surface 318b-1 of the second body 318b between the through hole 321 and the protrusion portion 322.

Figure 11A:
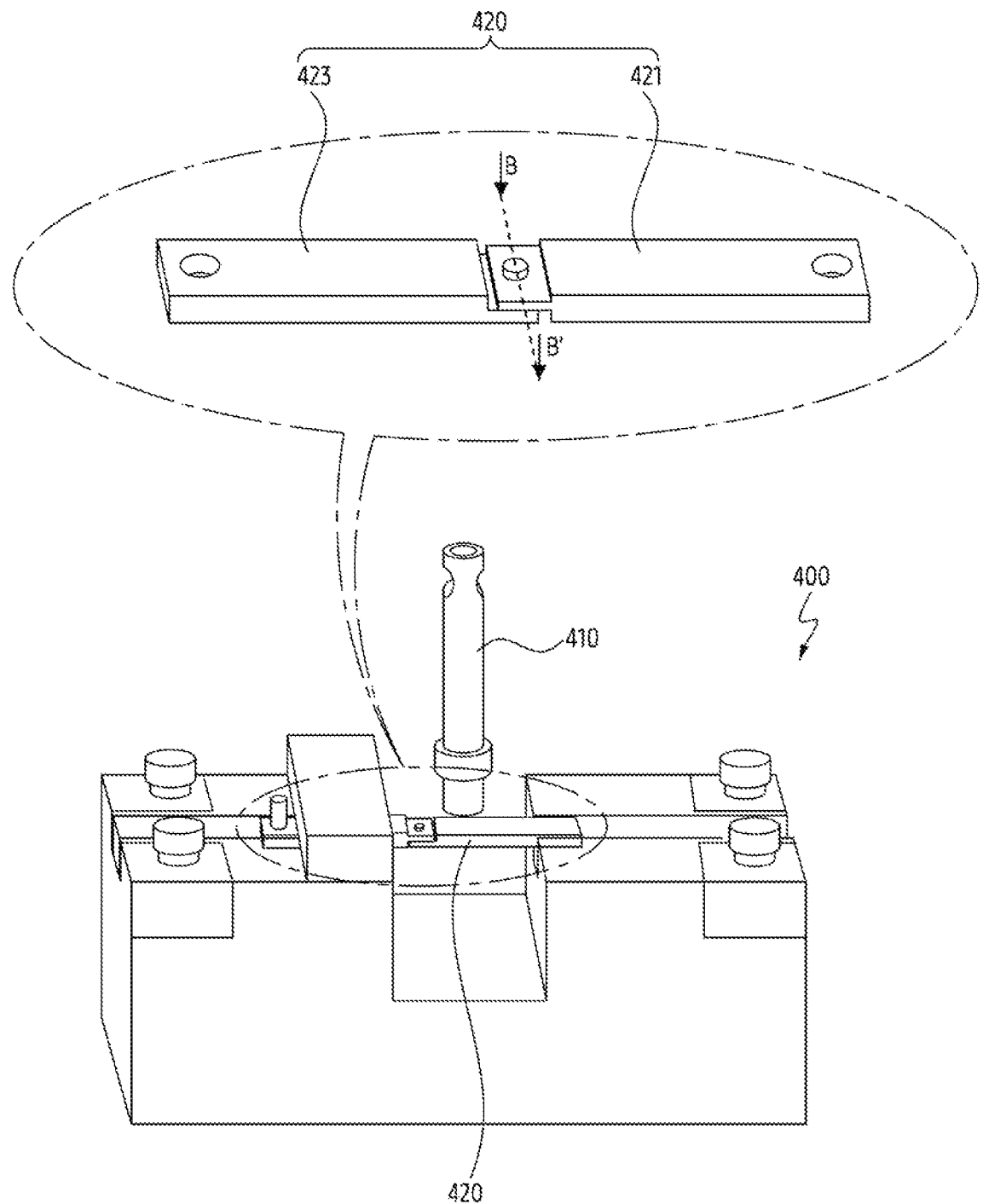
FIG. 11A illustrates an experimental apparatus for a side bezel structure of an exemplary electronic device and a coupling force of a plate.
Figure 11B:
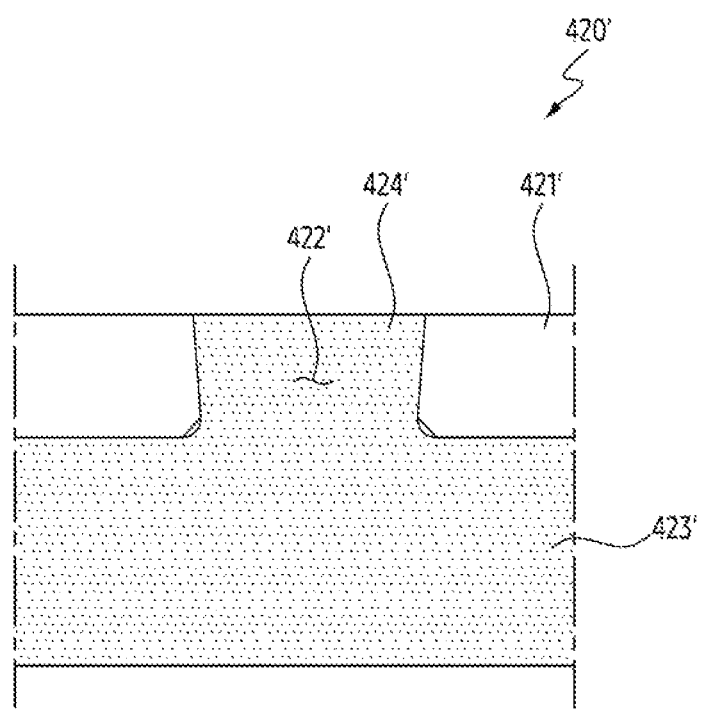
FIG. 11B is a cross-sectional view of a specimen according to a comparative example cut along B-B' of FIG. 11A.
Figure 11C:
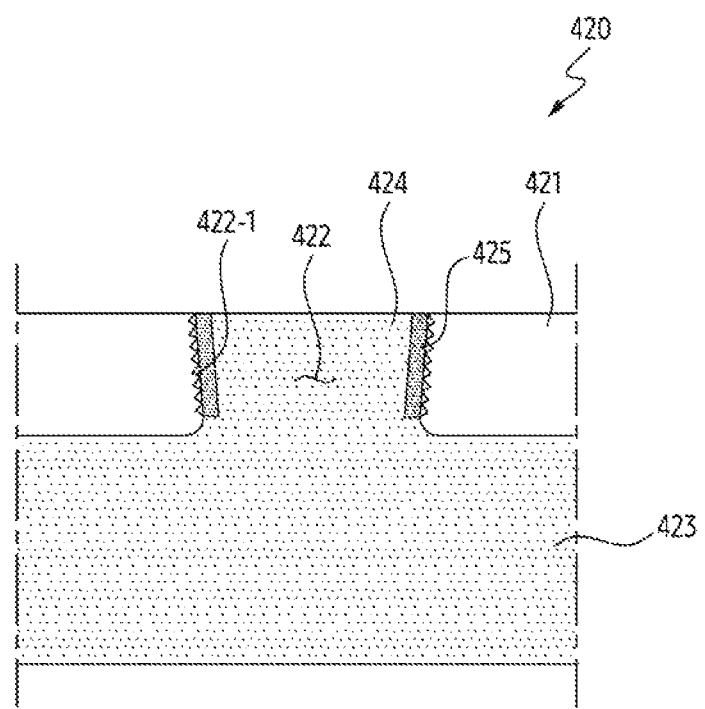
FIG. 11C is a cross-sectional view of a specimen according to an embodiment, taken along line B-B' of FIG. 11A.

FIG. 11A illustrates an experimental apparatus for a side bezel structure of an exemplary electronic device and a coupling force of a plate. FIG. 11B is a cross-sectional view of a specimen according to a comparative example cut along B-B' of FIG. 11A. FIG. 11C is a cross-sectional view of a specimen according to an embodiment, taken along line B-B' of FIG. 11A.

Referring to FIG. 11A, the experimental device 400 may perform a push test configured to apply force to the specimen 420. The experimental device 400 may include a push bar (a push rod, a pressure bar) 410 configured to press the specimen 420. The pushbar 410 may be configured to apply force from the upper portion of the specimen 420 toward the lower portion. The experimental device 400 may be configured to test the coupling force of the specimen 420, by measuring the force at which the specimen 420 is broken by the push bar 410. The specimen 420 used in the experiment may correspond to a housing (e.g., the housing 310 of FIG. 5A). The specimen 420 may include a first body 421 and a second body 423.

The first body 421 may correspond to the side bezel structure (e.g., the side bezel structure 318 of FIG. 5B). The second body 423 may correspond to a plate (e.g., the plate 342 of FIG. 5C). The first body 421 may include a through hole 422. The second body 423 may include a protrusion portion 424 inserted into the through hole 422. The through hole 422 may correspond to a through hole (e.g., the through hole 321 of FIG. 5B) of the side bezel structure 318. The protrusion portion 424 may correspond to the protrusion portion of the plate 342 (e.g., the protrusion portion 322 of FIG. 5C). The first body 421 may include a first metal (e.g., titanium) having a relatively high hardness. The second body 423 may include a second metal (e.g., aluminum) having a relatively low hardness.

Referring to FIG. 11B, the specimen 420' according to the comparative example may be configured to increase the cross-sectional area of the protrusion portion 424' and the cross-sectional area of the through hole 422' according to the height. Referring to FIG. 11C, the specimen 420 according to the embodiment may be configured to increase a cross-sectional area of the protrusion portion 424' and a cross-sectional area of the through hole 422' according to the height. Unlike the specimen 420' according to the comparative example, the specimen 420 according to the embodiment may be configured such that the through hole 422 has roughness through surface treatment of the through hole 422.

In the specimen 420 according to the embodiment unlike the specimen 420' according to the comparative example, a conductive adhesive member 425 may be disposed between the through hole 422 and the protrusion portion 424. As described above, except for the fact that the through hole 422 has roughness and the conductive adhesive member 425 is disposed between the through hole 422 and the protrusion portion 424, the specimen 420' according to the comparative example and the specimen 420 according to the embodiment may all have the same configuration.

Through the experimental device 400 shown in FIG. 11A, the coupling force of the specimen 420' according to the comparative example and the specimen 420 according to the embodiment was measured. The push bar 410 presses the upper part of the through hole 422 where the first body 318a and the second body 318b are coupled. When damage occurred in the specimens 420 and 420', the force applied by the push bar 410 to the specimens 420 and 420' was measured. [Table 1] below is a table showing the results of the experiment conducted five times.

TABLE 1

| experimental order | comparative example (unit: kgf) | embodiment (unit: kgf) |
| --- | --- | --- |
| 1 | 38.6 | 51.9 |
| 2 | 49.3 | 52.7 |
| 3 | 42.5 | 53.1 |
| 4 | 41.8 | 51.9 |
| 5 | 42.6 | 52.42 |
| average | 42.96 | 52.4 |

Referring to Table 1, the specimen 420 according to the embodiment is broken when pressed with an average force of 52.42 kgf by the push bar 410. The specimen 420' according to the comparative example is broken when pressed with an average force of 42.96 kgf by the push bar 410. Referring to [Table 1], it is identified that the coupling force of the specimen 420 according to the embodiment is stronger than that of the specimen 420' according to the comparative example. According to an embodiment, since the inner circumferential surface 422-1 of the through hole 422 has roughness, a contact area between the through hole 422 and the protrusion portion 424 may be increased. The conductive adhesive member 425 may increase coupling force between the through hole 422 and the protrusion portion 424 by filling a gap between the through hole 422 and the protrusion portion 424.

According to an embodiment, the side bezel structure 318 and the plate 342 may be coupled by a through hole 422 and a protrusion portion 424. According to an embodiment, the through hole 422 may have roughness on the inner circumferential surface 422-1 of the through hole 422 through a surface treatment (e.g., a blasting processing or a tap processing). According to an embodiment, a conductive adhesive member 425 may be disposed between the through hole 422 and the protrusion portion 424.

According to an embodiment, coupling force between the side bezel structure 318 and the plate 342 may be increased through the roughness of the inner circumferential surface 422-1 of the through hole 422 and the conductive adhesive member 425. Since the side bezel structure 318 and the plate 342 are firmly coupled, the electronic device 101 may stably communicate wirelessly with the external electronic device 101 through the conductive portion 318-1. Since the conductive portion 318-1 is fed by a wireless communication circuit (e.g., the wireless communication circuit 192 of FIG. 5A), the conductive portion 318-1 may operate as an antenna with constant performance.

Figure 12:
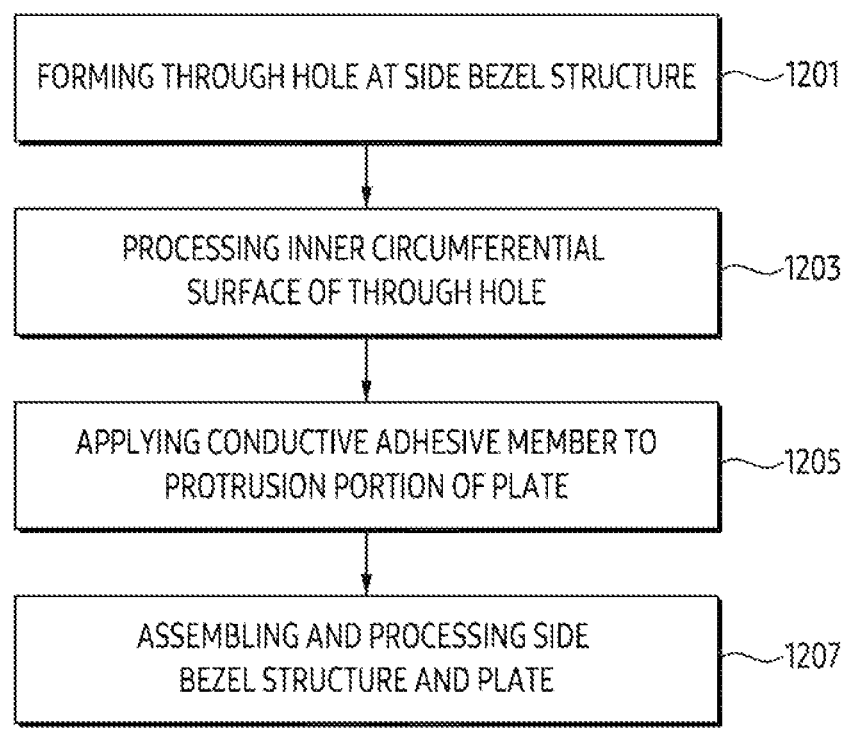
FIG. 12 is a flowchart of a method of manufacturing a housing of an exemplary electronic device.

FIG. 12 is a flowchart of a method of manufacturing a housing of an exemplary electronic device.

Referring to FIG. 12, in operation 1201, a side bezel structure (e.g., the side bezel structure 318 of FIG. 5B) may include a through hole (e.g., the through hole 321 of FIG. 5B). According to an embodiment, the through hole 321 may be formed in the side bezel structure 318 through computer numerical control (CNC) processing. The through hole 321 formed in operation 1201 may include a plurality of through holes spaced apart from each other along the periphery of the side bezel structure 318. According to an embodiment, the through hole 321 may penetrate from one surface (e.g., one surface of FIG. 6A 318b-1) of the second body (e.g., the second body 318b of FIG. 6A) to another surface (e.g., the other surface 318b-2 of FIG. 6A). A cross-sectional area of the through hole 321 formed on the one surface 318b-1 may be smaller than that of the through hole 321 formed on the other surface 318b-2.

In operation 1203, the inner circumferential surface of the through hole 321 (e.g., the inner circumferential surface 321-1 of FIG. 7) may be processed to have roughness. According to an embodiment, the inner circumferential surface of the through hole 321 may have roughness through a blasting processing. Through the blasting processing, the expansion area ratio of the inner circumferential surface of the through hole 321 may be increased. According to an embodiment, the inner circumferential surface of the through hole 321 may have roughness through a tap processing. Through the tap processing, the surface area of the inner circumferential surface of the through hole 321 may be increased.

In operation 1205, a conductive adhesive member (e.g., the conductive adhesive member 323 of FIG. 5C) may be applied to the protrusion portion (e.g., the protrusion portion 322 of FIG. 5C) of the plate (e.g., the plate 342 of FIG. 5C). The conductive adhesive member 323 may include a material having high electrical conductivity (e.g., silver). The conductive adhesive member 323 may be applied to the outer surface of the protrusion portion 322. According to an embodiment, the plate 342 may include a plurality of protrusion portions. The conductive adhesive member 323 may be applied to the outer surface of each of the plurality of protrusion portions.

In operation 1207, the side bezel structure 318 and the plate 342 may be assembled. Assembly of the side bezel structure 318 and the plate 342 may be performed by inserting the protrusion portion 322 into the through hole 321.

According to an embodiment, the protrusion portion 322 may be inserted into the through hole 321. When the plate 342 has a plurality of protrusion portions 322, each of the plurality of protrusion portions may be inserted into each of the corresponding plurality of through holes. Since the protrusion portion 322 protruding out of the through hole 321 is pressed by the press after the protrusion portion 322 is inserted into the through hole 321, a shape of the protrusion portion 322 may correspond to a shape of the through hole 321.

For example, when the length of the protrusion portion 322 is longer than the length of the through hole 321, a portion of the protrusion portion 322 protruding out of the through hole 321 may be pressed by the press. The portion of the protrusion portion 322 protruding out of the through hole 321 may correspond to the shape of the through hole 321 while being inserted into the through hole 321. Through above process, the cross-sectional area of the protrusion portion 322 in contact with one surface 318b-1 of the second body 318b may be narrower than the cross-sectional area of the protrusion portion 322 in contact with the other surface 318b-2 of the second body 318b. After assembling the side bezel structure 318 and the plate 342, the conductive adhesive member 323 may be hardened. For example, the conductive adhesive member 323 may be hardened at about 200° C. for about 20 minutes. After the conductive adhesive member 323 is hardened, a support portion of a polymer material (e.g., the support portion 319 of FIG. 6A) may be injected. After injection, an annealing process may be performed to remove residual stress in the injection part of the polymer material and improve physical properties (e.g., ductility, toughness). For example, the annealing process may be performed at about 150° C. for about 60 minutes.

According to an embodiment, in the housing 310 manufactured through the above process, coupling force between the side bezel structure 318 and the plate 342 may be improved. Since the conductive adhesive member 323 is disposed in the gap between the side bezel structure 318 and the plate 342, wireless communication performance through the conductive portion 318-1 may be maintained constantly.

According to an embodiment, the electronic device may stably perform wireless communication through the conductive portion by improving the coupling force between the plate and the side bezel structure configuring the housing of the electronic device.

According to an embodiment, an electronic device (e.g., the electronic device 101 of FIG. 5A) may include a side bezel structure (e.g., the side bezel structure 318 of FIG. 5B), a plate (e.g., the plate 342 of FIG. 5C), and a conductive adhesive member (e.g., the conductive adhesive member 323 of FIG. 6A). The side bezel structure may include a first body (e.g., the first body 318a of FIG. 6A) and a second body (e.g., the second body 318b of FIG. 6A). The first body may surround at least a part of the inner space of the electronic device. The second body may extend from the first body into the inner space. The second body may include a through hole (e.g., the through hole 321 of FIG. 5B). The plate may include a support portion (e.g., the support portion 343 of FIG. 5C) and a protrusion portion (e.g., the protrusion portion 322 of FIG. 5C). The support portion may be disposed in the inner space. The protrusion portion may extend into the through hole from the support portion and be coupled to the second body. The protrusion portion may correspond to the shape of the through hole. The conductive adhesive member may couple the through hole and the protrusion portion. The conductive adhesive member may be disposed between the through hole and the protrusion portion. The cross-sectional area of the protrusion portion contacting one surface of the second body facing the support portion (e.g., one surface 318b-1 of FIG. 6A) may be narrower than the cross-sectional area of the protrusion portion contacting another surface of the second body, which is opposite to the one surface of the second body (e.g., the other surface 318b-2 of FIG. 6A).

According to an embodiment of the disclosure, coupling force between the side bezel structure constituting the housing and the plate may be improved. Since the protrusion portion of the plate and the through hole of the side bezel structure are configured to vary in cross-sectional area along the direction in which they are coupled, the coupling force between the through hole and the protrusion portion may be increased. According to an embodiment, a conductive adhesive member disposed between the through hole and the protrusion portion may fill a gap between the protrusion portion and the through hole. The coupling force between the plate and the side bezel structure may be improved by the conductive adhesive member.

According to an embodiment, the second body may extend in a first direction parallel to the support portion. The through hole may extend in a second direction perpendicular to the first direction.

According to an embodiment, an intersection angle (e.g., intersection angle (A) of FIG. 6A) between the generatrix (e.g., generatrix (X) of FIG. 6A) of the protrusion portion and the support portion may be 81 degrees to 87 degrees.

According to an embodiment of the present disclosure, since the through hole and the protrusion portion are coupled in a perpendicular direction, an increasing effect of a coupling force due to a structure in which the cross-sectional area is changed may be improved.

According to an embodiment, the side bezel structure may include a first metal. The plate may include a second metal different from the first metal.

According to an embodiment, a hardness of the first metal may be higher a hardness of the second metal. According to an embodiment, a side bezel structure exposed to the outside of the housing may include a metal having a relatively high hardness, and a plate disposed within the housing may include a metal having a relatively low hardness. Compared to a case in which only a metal having high hardness is included, the overall weight of the housing of the electronic device according to an embodiment may be reduced. According to an embodiment, the electronic device may reduce the manufacturing cost of the housing. According to an embodiment, even when the housing is made of different metals, the coupling force between the side bezel structure and the plate may be improved through the shape of the protrusion portion and through hole, and the conductive adhesive member.

According to an embodiment, an inner circumferential surface of the through hole (e.g., the inner circumferential surface 321-1 of FIG. 7) may have roughness to increase a contact surface with the protrusion portion. According to an embodiment, since the inner circumferential surface of the through hole has roughness, the contact surface of the through hole and the protrusion portion may be increased. The increase in the contact surface may improve coupling force between the protrusion portion and the through hole. The roughness may be formed through blasting processing or tap processing.

According to an embodiment, a periphery of the support portion may overlap a periphery of the second body when viewing the support portion from above. The protrusion portion may be disposed within a region including the periphery of the support portion. The conductive adhesive member may fill a gap between the protrusion portion and the through hole. According to an embodiment, the periphery of the support portion including the protrusion portion may overlap the periphery of the second body including the through hole. Through the above structure, the protrusion portion may be inserted into the through hole in the perpendicular direction. The conductive adhesive member may fill a gap between the protrusion portion and the through hole with a material having high electrical conductivity (e.g., silver). The conductive adhesive member may improve coupling force between the through hole and the protrusion portion by filling the gap between the through hole and the protrusion portion.

According to an embodiment, the through hole may include a first region (e.g., the first region 321a of FIG. 8A) and a second region (e.g., the second region 321b of FIG. 8A). The first region may contact the support portion. The second region may extend from the first region in a direction in which the protrusion portion extends from the support portion. A cross-sectional area of the first region may be different from a cross-sectional area of the second region.

According to an embodiment, a first intersection angle (e.g., the first intersection angle A1 of FIG. 8A) between a first generatrix (e.g., the first generatrix X1 of FIG. 8A) of the protrusion portion disposed in the first region and the support portion is greater than a second intersection angle (e.g., the second intersection angle A2 of FIG. 8A) between a second generatrix (e.g., the second generatrix X2 of FIG. 8A) of the protrusion portion disposed in the second region and the support portion.

According to an embodiment, the first intersection angle may be 81 degrees to 87 degrees. The second intersection angle may be 60 degrees to 80 degrees.

According to an embodiment, the through hole may include two regions having different cross-sectional area increase rates. The protrusion portion may have a shape corresponding to the shape of the two regions in a state of being inserted into the through hole. Coupling force between the protrusion portion and the through hole may be improved through the two regions. According to an embodiment, since the through hole includes the above two regions, the contact surface between the through hole and the protrusion portion may be increased. Coupling force between the through hole and the protrusion portion may be improved by increasing the contact surface.

According to an embodiment, the conductive adhesive member may be disposed between the through hole and the protrusion portion and between the plate and the second body. According to an embodiment, since the conductive adhesive member is disposed between the plate and the second body, coupling force between the side bezel structure and the plate may be improved.

According to an embodiment, the protrusion portion may include a head (e.g., the head 322a of FIG. 9a). The head may be disposed on the other surface of the second body. The head may cover a through hole formed on the other surface. According to an embodiment, the protrusion portion may not be separated from the through hole even when an external force is applied to the housing, by including a head protruding on the through hole. The head may restrict movement of the protrusion portion in a direction in which the protrusion portion is separated from the through hole.

According to an embodiment, the conductive adhesive member may be disposed between the through hole and the protrusion portion and between the head and the second body. According to an embodiment, the conductive adhesive member may provide coupling between the head and side bezel structures.

According to an embodiment, the side bezel structure may include a conductive portion (e.g., the conductive portion 318-1 of FIG. 5A) and a non-conductive portion (e.g., the non-conductive portion 318-2 and 318-3 of FIG. 5A). The non-conductive portion may be in contact with the conductive portion. The electronic device may further include a wireless communication circuit (e.g., the wireless communication circuit 192 of FIG. 5A). The wireless communication circuit may be configured to wirelessly communicate with an external electronic device through the conductive portion.

According to an embodiment, the wireless communication circuit may be configured to transmit or receive a wireless communication signal of a designated band by feeding power to a feed point of the conductive portion. According to an embodiment, the gap between the through hole and the protrusion portion may be filled with a material with high electrical conductivity (e.g., silver) by filling the conductive adhesive member between the through hole and the protrusion portion. The conductive adhesive member may reduce loss of an electrical signal flowing along the conductive portion of the side bezel structure when the conductive portion operates as an antenna. According to an embodiment, the electronic device may have constant wireless communication performance by firmly coupling the side bezel structure and the plate.

According to an embodiment, an electronic device (e.g., the electronic device 101 of FIG. 5A) may include a side bezel structural (e.g., the side bezel structure 318 of FIG. 5B), a plate (e.g., the plate 342 of FIG. 5C), a conductive adhesive member (e.g., the conductive adhesive member 323 of FIG. 6A), and a wireless communication circuit (e.g., the wireless communication circuit 192 of FIG. 5A). The side bezel structure may include a first body (e.g., the first body 318a of FIG. 6A) and a second body (e.g., the second body 318b of FIG. 6A). The first body may surround at least a part of the inner space of the electronic device. The second body may extend from the first body into the inner space. The second body may include a through hole (e.g., the through hole 321 of FIG. 5B). The side bezel structure may include a conductive portion (e.g., the conductive portion 381-1 of FIG. 5A) and a non-conductive portion (e.g., the non-conductive portion 318-2 and 318-3 of FIG. 5A). The conductive portion may include a first metal having a first hardness. The non-conductive portion may be in contact with the conductive portion. The plate may include a support portion (e.g., the support portion 343 of FIG. 5C) and a protrusion portion (e.g., the protrusion portion 322 of FIG. 5C). The support portion may be disposed in the inner space. The protrusion portion may extend into the through hole from the support portion and be coupled to the second body. The protrusion portion may correspond to the shape of the through hole. The plate may include a second metal having a second hardness lower than the first hardness. The conductive adhesive member may electrically connect the through hole and the protrusion portion. The conductive adhesive member may be disposed between the through hole and the protrusion portion. The wireless communication circuit may be operatively coupled with the conductive portion. The wireless communication circuit may be configured to communicate with an external electronic device using a signal of a designated frequency band through the conductive portion. The cross-sectional area of the protrusion portion contacting one surface of the second body facing the support portion (e.g., one surface 318b-1 of FIG. 6A) may be narrower than the cross-sectional area of the protrusion portion contacting the other surface of the second body, which is opposite to the one surface of the second body (e.g., the other surface 318b-2 of FIG. 6A). According to an embodiment, coupling force between the side bezel structure constituting the housing and the plate may be improved. Since the protrusion portion of the plate and the through hole of the side bezel structure are configured to vary in cross-sectional area along the direction in which they are coupled, the coupling force between the through hole and the protrusion portion may increase. According to an embodiment, a conductive adhesive member disposed between the through hole and the protrusion portion may fill a gap between the protrusion portion and the through hole. The coupling force between the plate and the side bezel structure may be improved by the conductive adhesive member. According to an embodiment, the side bezel structure and the plate are firmly coupled, so that the electronic device may have constant wireless communication performance.

According to an embodiment, the second body may extend in a first direction parallel to the support portion. The through hole may extend in a second direction perpendicular to the first direction.

According to an embodiment, an intersection angle (e.g., intersection angle (A) of FIG. 6A) of the generatrix (e.g., generatrix (X) of FIG. 6A) of the protrusion portion and the support portion may be 81 degrees to 87 degrees. According to an embodiment, since the through hole and the protrusion portion are coupled in the perpendicular direction, the effect of increasing the coupling force due to the structure in which the cross-sectional area is changed may be improved.

According to an embodiment, an inner circumferential surface of the through hole (e.g., the inner circumferential surface 321-1 of FIG. 7) may have a roughness to increase a contact surface with the protrusion portion. According to an embodiment, since the inner circumferential surface of the through hole has roughness, the contact surface of the through hole and protrusion portion may be increased. An increase in the contact surface may improve coupling force between the protrusion portion and the through hole. The roughness may be formed through blasting processing or tap processing.

According to an embodiment, the conductive adhesive member may be disposed between the through hole and the protrusion portion and between the plate and the second body. According to an embodiment, the conductive adhesive member may improve coupling force between the side bezel structure and the plate by being disposed between the plate and the second body.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that one or more embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). If an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with one or more embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

One or more embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities, and some of the multiple entities may be separately disposed in different components. According to one or more embodiments, one or more of the above-described components may be omitted, or one or more other components may be added. Alternatively or additionally, a plurality of components (e.g., modules or programs) may be integrated into a single component. In such a case, according to one or more embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a side bezel structure comprising:
      a first body surrounding at least a portion of an inner space of the electronic device, and
      a second body extending from the first body into the inner space and including a through hole;
   a plate comprising a support portion within the inner space;
   a protrusion portion extending from the support portion into the through hole, the protrusion portion being coupling to the second body and corresponding to the shape of the through hole; and
   a conductive adhesive member coupling the through hole and the protrusion portion, the conductive adhesive member being disposed between the through hole and the protrusion portion,
   wherein a cross-sectional area of the protrusion portion contacting one surface of the second body toward the support portion is narrower than a cross-sectional area of the protrusion portion contacting another surface of the second body, and
   wherein the another surface of the second body is opposite to the one surface of the second body.

2. The electronic device of claim 1, wherein the second body extends in a first direction parallel to the support portion, and
   wherein the through hole extends in a second direction perpendicular to the first direction.

3. The electronic device of claim 1, wherein an intersection angle (A) between a generatrix (X) of the protrusion portion and the support portion is equal to or between 81 degrees to 87 degrees.

4. The electronic device of claim 1, wherein the side bezel structure comprises a first metal, and
   wherein the plate includes a second metal different from the first metal.

5. The electronic device of claim 4, wherein a hardness of the first metal is higher than a hardness of the second metal.

6. The electronic device of claim 1, wherein an inner circumferential surface of the through hole is uneven and is in contact with the protruding portion.

7. The electronic device of claim 1, wherein a periphery of the support portion overlaps a periphery of the second body when viewing the support portion from above,
   wherein the protrusion portion is disposed in an area comprising the periphery of the support portion, and
   wherein the conductive adhesive member fills a gap between the protrusion portion and the through hole.

8. The electronic device of claim 1, wherein the through hole comprising:
   a first region in contact with the support portion, and
   a second region extending from the first region in a direction in which the protrusion portion extends from the support portion, and
   wherein a cross-sectional area of the first region is different from a cross-sectional area of the second region.

9. The electronic device of claim 8, wherein a first intersection angle (A1) between a first generatrix (X1) of the protrusion portion disposed in the first region and the support portion is greater than a second intersection angle (A2) between a second generatrix (X2) of the protrusion portion disposed in the second region and the support portion.

10. The electronic device of claim 9, wherein the first intersection angle (A1) is equal to or between 81 degrees to 87 degrees, and the second intersection angle (A2) is equal to or between 60 degrees to 80 degrees.

11. The electronic device of claim 1, wherein the conductive adhesive member is disposed between the through hole and the protrusion portion, and
   wherein the conductive adhesive member is disposed between the plate and the second body.

12. The electronic device of claim 1, wherein the protrusion portion comprises a head disposed on the another surface of the second body, and
wherein the head covers the through hole formed in the another surface.

13. The electronic device of claim 12, wherein the conductive adhesive member is disposed between the through hole and the protrusion portion, and
wherein the conductive adhesive member is disposed between the head and the second body.

14. The electronic device of claim 1, wherein the side bezel structure comprising a conductive portion and a non-conductive portion in contact with the conductive portion, and
wherein the electronic device further comprises a wireless communication circuit configured to communicate with an external electronic device through the conductive portion.

15. The electronic device of claim 14, wherein the wireless communication circuit is configured to transmit or receive a wireless communication signal in a designated band by feeding to a feed point of the conductive portion.

16. An electronic device comprising:
a side bezel structure comprising:
a first body surrounding at least a portion of an inner space of the electronic device,
a second body extending from the first body into the inner space and the second body comprising a through hole,
a conductive portion comprising a first metal having a first hardness, and
a non-conductive portion in contact with the conductive portion;
a plate comprising:
a support portion within the inner space, and
a protrusion portion extending from the support portion into the through hole, the protrusion portion being coupling to the second body and being corresponding to a shape of the through hole, and
a second metal having a second hardness lower than the first hardness;
a conductive adhesive member electrically connecting the through hole and the protrusion portion, conductive adhesive member being disposed between the through hole and the protrusion portion; and
a wireless communication circuit operatively coupling with the conductive portion,
wherein a cross-sectional area of the protrusion portion is narrower than a cross-sectional area of the protrusion portion contacting another surface of the second body,
wherein the cross-sectional area of the protrusion portion contacts one surface of the second body toward the support portion, and
wherein the another surface of the second body is opposite to the one surface of the second body.

17. The electronic device of claim 16, wherein the second body extends in a first direction parallel to the support portion, and
wherein the through hole extends in a second direction perpendicular to the first direction.

18. The electronic device of claim 16, wherein an intersection angle (A) between a generatrix (X) of the protrusion portion and the support portion is equal to or between 81 degrees to 87 degrees.

19. The electronic device of claim 16, wherein an inner circumferential surface of the through hole is uneven and is in contact with the protruding portion.

20. The electronic device of claim 16, wherein the conductive adhesive member is disposed between the through hole and the protrusion portion, and
the conductive adhesive member is disposed between the plate and the second body.

* * * * *